(12) United States Patent
Foster et al.

(10) Patent No.: US 8,712,868 B2
(45) Date of Patent: Apr. 29, 2014

(54) LISTING RECOMMENDATION USING GENERATION OF A USER-SPECIFIC QUERY IN A NETWORK-BASED COMMERCE SYSTEM

(75) Inventors: Benjamin David Foster, San Jose, CA (US); Leonard Robert Speiser, Redwood City, CA (US); Lori Kathleen Stewart, San Jose (CA); Andrew Leigh Sandler, San Jose, CA (US); Charles Zoran Kalko, Los Gatos, CA (US); Sterling Ryan Quick, San Jose, CA (US); Anne Chang Raimondi, San Jose, CA (US)

(73) Assignee: eBay Inc., San Jose, CA (US)

( * ) Notice: Subject to any disclaimer, the term of this patent is extended or adjusted under 35 U.S.C. 154(b) by 292 days.

(21) Appl. No.: 12/870,031

(22) Filed: Aug. 27, 2010

(65) Prior Publication Data

US 2011/0055040 A1      Mar. 3, 2011

Related U.S. Application Data

(63) Continuation of application No. 10/689,970, filed on Oct. 20, 2003, now Pat. No. 7,831,476.

(60) Provisional application No. 60/420,199, filed on Oct. 21, 2002.

(51) Int. Cl.
    *G06Q 30/00*      (2012.01)

(52) U.S. Cl.
    USPC ................ 705/26.7; 707/722; 707/767

(58) Field of Classification Search
    CPC .......... G06Q 30/0623; G06Q 30/0631; G06Q 30/0256; G06F 17/30867; G06F 17/30477; G06F 17/3053; G06F 17/3064
    USPC .............. 705/26–27.2; 707/722, 767
    See application file for complete search history.

(56) References Cited

U.S. PATENT DOCUMENTS

| 3,757,037 A | 9/1973 | Bialek |
| 4,992,940 A | 2/1991 | Dworkin |

(Continued)

FOREIGN PATENT DOCUMENTS

| AU | 2010202828 B2 | 2/2012 |
| EP | 0957437 A2 | 11/1999 |

(Continued)

OTHER PUBLICATIONS

Hirooka, Yasuo, et al.; "Extending Content-Based Recommendation by Order-Matching and Cross-Matching Methods," Lecture Notes in Computer Science; vol. 1875, Proceedings of the First International Conference on Electronic Commerce and Web Technologies, (Sep. 2000), 177-190.*

(Continued)

*Primary Examiner* — Adam Levine
(74) *Attorney, Agent, or Firm* — Schwegman, Lundberg & Woessner, P.A.

(57) ABSTRACT

According to one aspect of the invention, there is provided a method to facilitate generating listing recommendations to a user of a network-based commerce system. In one embodiment, the method includes identifying a term associated with a user interaction in a network-based commerce system. The method further includes generating a recommendation query including the identified term. In addition, the method includes running the recommendation query against a plurality of listings hosted by the network-based commerce system to identify a recommendation. Moreover, the method includes presenting the recommendation to a user of the network-based commerce system.

19 Claims, 17 Drawing Sheets

(56) References Cited

U.S. PATENT DOCUMENTS

| | | |
|---|---|---|
| 4,996,642 A | 2/1991 | Hey |
| 5,310,997 A | 5/1994 | Roach et al. |
| 5,583,763 A | 12/1996 | Atcheson et al. |
| 5,749,081 A | 5/1998 | Whiteis |
| 5,790,426 A | 8/1998 | Robinson |
| 5,790,790 A | 8/1998 | Smith et al. |
| 5,825,881 A | 10/1998 | Colvin, Sr. |
| 5,842,199 A | 11/1998 | Miller et al. |
| 5,845,265 A | 12/1998 | Woolston |
| 5,897,622 A | 4/1999 | Blinn et al. |
| 6,006,225 A * | 12/1999 | Bowman et al. ............... 1/1 |
| 6,016,475 A | 1/2000 | Miller et al. |
| 6,041,311 A | 3/2000 | Chislenko et al. |
| 6,047,264 A | 4/2000 | Fisher et al. |
| 6,049,777 A | 4/2000 | Sheena et al. |
| 6,055,513 A | 4/2000 | Katz et al. |
| 6,061,448 A | 5/2000 | Smith et al. |
| 6,064,980 A | 5/2000 | Jacobi et al. |
| 6,085,176 A | 7/2000 | Woolston |
| 6,085,229 A | 7/2000 | Newman et al. |
| 6,092,049 A | 7/2000 | Chislenko et al. |
| 6,101,484 A | 8/2000 | Halbert et al. |
| 6,101,486 A | 8/2000 | Roberts et al. |
| 6,108,493 A | 8/2000 | Miller et al. |
| 6,119,101 A | 9/2000 | Peckover |
| 6,119,137 A | 9/2000 | Smith et al. |
| 6,169,986 B1 | 1/2001 | Bowman et al. |
| 6,178,408 B1 | 1/2001 | Copple et al. |
| 6,192,407 B1 | 2/2001 | Smith et al. |
| 6,195,657 B1 | 2/2001 | Rucker et al. |
| 6,202,051 B1 | 3/2001 | Woolston |
| 6,243,691 B1 | 6/2001 | Fisher et al. |
| 6,246,997 B1 | 6/2001 | Cybul et al. |
| 6,266,649 B1 | 7/2001 | Linden et al. |
| 6,308,168 B1 | 10/2001 | Dovich et al. |
| 6,313,745 B1 | 11/2001 | Suzuki |
| 6,317,722 B1 | 11/2001 | Jacobi et al. |
| 6,321,221 B1 | 11/2001 | Bieganski |
| 6,334,127 B1 | 12/2001 | Bieganski et al. |
| 6,356,879 B2 | 3/2002 | Aggarwal et al. |
| 6,360,216 B1 | 3/2002 | Hennessey et al. |
| 6,370,513 B1 | 4/2002 | Kolawa et al. |
| 6,412,012 B1 | 6/2002 | Bieganski et al. |
| 6,415,270 B1 | 7/2002 | Rackson et al. |
| 6,421,675 B1 | 7/2002 | Ryan et al. |
| 6,430,558 B1 | 8/2002 | Delano |
| 6,466,918 B1 | 10/2002 | Spiegel et al. |
| 6,484,149 B1 | 11/2002 | Jammes et al. |
| 6,487,539 B1 | 11/2002 | Aggarwal et al. |
| 6,490,577 B1 | 12/2002 | Anwar |
| 6,499,029 B1 | 12/2002 | Kurapati et al. |
| 6,587,838 B1 | 7/2003 | Esposito et al. |
| 6,615,247 B1 | 9/2003 | Murphy |
| 6,636,836 B1 | 10/2003 | Pyo |
| 6,671,681 B1 | 12/2003 | Emens et al. |
| 6,701,309 B1 | 3/2004 | Beeferman et al. |
| 6,704,727 B1 | 3/2004 | Kravets |
| 6,732,088 B1 | 5/2004 | Glance |
| 6,772,150 B1 | 8/2004 | Whitman et al. |
| 6,782,370 B1 | 8/2004 | Stack |
| 6,785,671 B1 | 8/2004 | Bailey et al. |
| 6,801,909 B2 | 10/2004 | Delgado et al. |
| 6,813,775 B1 | 11/2004 | Finseth et al. |
| 6,853,982 B2 | 2/2005 | Smith et al. |
| 6,859,807 B1 | 2/2005 | Knight et al. |
| 6,865,546 B1 | 3/2005 | Song |
| 6,963,850 B1 | 11/2005 | Bezos et al. |
| 7,016,863 B1 | 3/2006 | Kamakura et al. |
| 7,092,936 B1 | 8/2006 | Alonso et al. |
| 7,225,182 B2 | 5/2007 | Paine et al. |
| 7,330,826 B1 | 2/2008 | Porat et al. |
| 7,831,476 B2 | 11/2010 | Foster et al. |
| 8,051,040 B2 | 11/2011 | Johnson et al. |
| 8,200,687 B2 | 6/2012 | Gupta |
| 8,275,673 B1 | 9/2012 | Poon |
| 2001/0021914 A1 | 9/2001 | Jacobi et al. |
| 2001/0021921 A1 | 9/2001 | Kan et al. |
| 2001/0034662 A1 | 10/2001 | Morris |
| 2001/0037255 A1 | 11/2001 | Tambay |
| 2001/0037259 A1 | 11/2001 | Sharma et al. |
| 2001/0044758 A1 | 11/2001 | Talib et al. |
| 2001/0054021 A1 | 12/2001 | Kawakura et al. |
| 2001/0056395 A1 | 12/2001 | Khan |
| 2002/0010625 A1 | 1/2002 | Smith et al. |
| 2002/0013734 A1 | 1/2002 | Bueno |
| 2002/0016786 A1 | 2/2002 | Pitkow et al. |
| 2002/0019763 A1 | 2/2002 | Linden et al. |
| 2002/0022994 A1 | 2/2002 | Miller et al. |
| 2002/0026386 A1 | 2/2002 | Walden |
| 2002/0052873 A1 | 5/2002 | Delgado et al. |
| 2002/0055890 A1 | 5/2002 | Foley |
| 2002/0059116 A1 | 5/2002 | Bulatovic et al. |
| 2002/0062258 A1 | 5/2002 | Bailey et al. |
| 2002/0062268 A1 | 5/2002 | Sato et al. |
| 2002/0065760 A1 | 5/2002 | Wiesehuegel et al. |
| 2002/0065802 A1 | 5/2002 | Uchiyama |
| 2002/0065877 A1 | 5/2002 | Kowtko et al. |
| 2002/0082901 A1 | 6/2002 | Dunning et al. |
| 2002/0099629 A1 | 7/2002 | Sato et al. |
| 2002/0103692 A1 | 8/2002 | Rosenberg et al. |
| 2002/0103789 A1 | 8/2002 | Turnbull et al. |
| 2002/0107853 A1 | 8/2002 | Hofmann et al. |
| 2002/0138331 A1 | 9/2002 | Hosea et al. |
| 2002/0143660 A1 | 10/2002 | Himmel et al. |
| 2002/0147628 A1 | 10/2002 | Specter et al. |
| 2002/0147724 A1 | 10/2002 | Fries et al. |
| 2002/0156686 A1 | 10/2002 | Kraft et al. |
| 2002/0161664 A1 | 10/2002 | Shaya et al. |
| 2002/0174428 A1 | 11/2002 | Agnihotri et al. |
| 2002/0184116 A1 | 12/2002 | Tam et al. |
| 2002/0198882 A1 | 12/2002 | Linden et al. |
| 2003/0009411 A1 | 1/2003 | Ram et al. |
| 2003/0028427 A1 | 2/2003 | Dutta et al. |
| 2003/0037041 A1 | 2/2003 | Hertz |
| 2003/0037050 A1 * | 2/2003 | Monteverde ............... 707/6 |
| 2003/0050863 A1 | 3/2003 | Radwin |
| 2003/0051240 A1 | 3/2003 | Schaffer et al. |
| 2003/0055831 A1 * | 3/2003 | Ryan et al. ............... 707/100 |
| 2003/0061122 A1 | 3/2003 | Berkowitz et al. |
| 2003/0069740 A1 | 4/2003 | Zeidman |
| 2003/0084450 A1 | 5/2003 | Thurston et al. |
| 2003/0093331 A1 | 5/2003 | Childs et al. |
| 2003/0093793 A1 | 5/2003 | Gutta |
| 2003/0105682 A1 | 6/2003 | Dicker et al. |
| 2003/0110056 A1 | 6/2003 | Berghofer et al. |
| 2003/0130994 A1 | 7/2003 | Singh et al. |
| 2003/0131070 A1 | 7/2003 | Stroebel et al. |
| 2003/0145326 A1 | 7/2003 | Gutta et al. |
| 2003/0182196 A1 | 9/2003 | Huang |
| 2003/0182249 A1 | 9/2003 | Buczak |
| 2003/0208399 A1 | 11/2003 | Basak et al. |
| 2003/0217332 A1 | 11/2003 | Smith et al. |
| 2003/0229537 A1 | 12/2003 | Dunning et al. |
| 2003/0233655 A1 | 12/2003 | Gutta et al. |
| 2004/0034652 A1 | 2/2004 | Hofmann et al. |
| 2004/0039657 A1 | 2/2004 | Behrens et al. |
| 2004/0078214 A1 | 4/2004 | Speiser et al. |
| 2004/0078297 A1 | 4/2004 | Veres et al. |
| 2004/0103092 A1 | 5/2004 | Tuzhilin et al. |
| 2004/0128321 A1 | 7/2004 | Hamer |
| 2004/0143450 A1 | 7/2004 | Vidali |
| 2004/0143584 A1 | 7/2004 | Chun et al. |
| 2004/0153463 A1 | 8/2004 | Sasai et al. |
| 2004/0193612 A1 | 9/2004 | Chang |
| 2004/0205558 A1 | 10/2004 | Holloway et al. |
| 2004/0230499 A1 | 11/2004 | Stack |
| 2004/0236736 A1 | 11/2004 | Whitman et al. |
| 2004/0260621 A1 | 12/2004 | Foster et al. |
| 2004/0267613 A1 | 12/2004 | Chan et al. |
| 2005/0028207 A1 | 2/2005 | Finseth et al. |
| 2005/0038717 A1 | 2/2005 | McQueen et al. |
| 2005/0038733 A1 | 2/2005 | Foster et al. |
| 2005/0055713 A1 | 3/2005 | Lee et al. |
| 2005/0076003 A1 | 4/2005 | DuBose et al. |

(56) References Cited

U.S. PATENT DOCUMENTS

| | | |
|---|---|---|
| 2005/0091209 A1 | 4/2005 | Frank et al. |
| 2005/0102259 A1 | 5/2005 | Kapur |
| 2005/0102282 A1 | 5/2005 | Linden |
| 2005/0125240 A9 | 6/2005 | Speiser et al. |
| 2005/0125392 A1 | 6/2005 | Curtis et al. |
| 2005/0144086 A1 | 6/2005 | Speiser et al. |
| 2005/0198068 A1 | 9/2005 | Mukherjee et al. |
| 2005/0234881 A1 | 10/2005 | Burago et al. |
| 2005/0234972 A1 | 10/2005 | Zeng et al. |
| 2005/0283488 A1 | 12/2005 | Colossi et al. |
| 2006/0026113 A1 | 2/2006 | Omoigui |
| 2006/0053096 A1 | 3/2006 | Subramanian et al. |
| 2006/0080292 A1 | 4/2006 | Alanzi |
| 2006/0085391 A1 | 4/2006 | Turski et al. |
| 2006/0106769 A1 | 5/2006 | Gibbs |
| 2006/0129533 A1 | 6/2006 | Purvis |
| 2006/0161520 A1 | 7/2006 | Brewer et al. |
| 2006/0167857 A1 | 7/2006 | Kraft et al. |
| 2006/0195442 A1 | 8/2006 | Cone et al. |
| 2006/0206475 A1 | 9/2006 | Naam et al. |
| 2006/0212447 A1 | 9/2006 | Davis et al. |
| 2006/0224554 A1 | 10/2006 | Bailey et al. |
| 2006/0224587 A1 | 10/2006 | Zamir et al. |
| 2006/0230005 A1 | 10/2006 | Bailey et al. |
| 2006/0230040 A1 | 10/2006 | Curtis et al. |
| 2006/0248078 A1 | 11/2006 | Gross et al. |
| 2006/0253458 A1 | 11/2006 | Dixon et al. |
| 2006/0271524 A1 | 11/2006 | Tanne et al. |
| 2006/0288000 A1 | 12/2006 | Gupta |
| 2007/0118802 A1 | 5/2007 | Gerace et al. |
| 2007/0288433 A1 | 12/2007 | Gupta et al. |
| 2008/0077574 A1 | 3/2008 | Gross |
| 2008/0147661 A1 | 6/2008 | Carden |
| 2008/0306938 A1 | 12/2008 | Johnson et al. |
| 2010/0017398 A1 | 1/2010 | Gupta et al. |
| 2010/0250341 A1 | 9/2010 | Hauser |
| 2010/0325011 A1 | 12/2010 | Foster et al. |
| 2012/0016893 A1 | 1/2012 | Johnson et al. |
| 2012/0239679 A1 | 9/2012 | Gupta |
| 2012/0296764 A1 | 11/2012 | Poon et al. |

FOREIGN PATENT DOCUMENTS

| | | |
|---|---|---|
| JP | 2005032193 A | 9/1996 |
| JP | 09244945 | 9/1997 |
| JP | 11250086 A | 9/1999 |
| JP | 2002092032 | 3/2002 |
| JP | 2002123544 | 4/2002 |
| JP | 2002215659 A | 8/2002 |
| JP | 2004502213 A | 1/2004 |
| JP | 2005063277 A | 3/2005 |
| WO | WO-0017792 A1 | 3/2000 |
| WO | WO-0017793 A1 | 3/2000 |
| WO | WO-0045319 A1 | 8/2000 |
| WO | WO-0116848 A2 | 3/2001 |
| WO | WO-0129726 A2 | 4/2001 |
| WO | WO-0131537 A2 | 5/2001 |
| WO | WO-0131537 A2 | 5/2001 |
| WO | WO-0133401 A2 | 5/2001 |
| WO | WO-0219203 A2 | 3/2002 |
| WO | WO-0229695 A1 | 4/2002 |
| WO | WO-0237926 A2 | 5/2002 |
| WO | WO-2004114155 A1 | 12/2004 |
| WO | WO-2005003898 A2 | 1/2005 |
| WO | WO-2005003898 A3 | 1/2005 |
| WO | WO-2007001980 A2 | 1/2007 |
| WO | WO-2007001980 A3 | 1/2007 |

OTHER PUBLICATIONS

U.S. Appl. No. 10/263,224, Appeal Decision mailed Aug. 24, 2011, 8 pgs.
U.S. Appl. No. 11/323,486, Appeal Brief Filed Oct. 24, 2011.
U.S. Appl. No. 12/870,022, Advisory Action mailed Sep. 26, 2011, 3 pgs.
U.S. Appl. No. 12/870,022, Advisory Action mailed Nov. 9, 2011, 4 pgs.
U.S. Appl. No. 12/870,022, Decision on Pre-Appeal Brief mailed Nov. 14, 2011, 2 pgs.
U.S. Appl. No. 12/870,022, Pre-Appeal Brief Request filed Oct. 4, 2011, 5 pgs.
U.S. Appl. No. 13/247,798, Preliminary Amendment Filed Oct. 4, 2011, 3 pgs.
Australian Application Serial No. 2010202828, Response filed Sep. 28, 2011 to Office Action mailed Apr. 20, 2011, 7 pgs.
U.S. Appl. No. 10/666,681, Decision on Appeal Brief mailed Sep. 3, 2010, 7 pgs.
U.S. Appl. No. 10/877,806, Advisory Action mailed Sep. 28, 2010, Advisory Action, 3 pgs.
U.S. Appl. No. 10/877,806, Response filed Sep. 7, 2010 to Final Office Action mailed Jul. 8, 2010, 12 pgs.
U.S. Appl. No. 11/323,486, Non-Final Office Action mailed Oct. 1, 2010, 43 pgs.
European Application Serial No. 06773535.7, Extended European Search Report mailed Sep. 24, 2010, 9 Pgs.
Linden, G, et al., "Amazon.com recommendations item-to-item collaborative filtering", IEEE Internet Computing vol. 7, No. 1, DOI : 10.1109/MIC 2003; XP011095524, (Jan. 1, 2003), 76-80.
U.S. Appl. No. 10/200,908, Advisory Action mailed Aug. 27, 2004, 6 pgs.
U.S. Appl. No. 10/200,908, Final Office Action mailed Feb. 26, 2004, 13 pgs.
U.S. Appl. No. 10/200,908, Non Final Office Action mailed Oct. 8, 2003, 13 pgs.
U.S. Appl. No. 10/200,908, Response filed Jan. 8, 2004 to Non Final Office Action mailed Oct. 8, 2003, 20 pgs.
U.S. Appl. No. 10/200,908, Response filed Jun. 24, 2004 to Final Office Action mailed Feb. 26, 2004, 21 pgs.
U.S. Appl. No. 10/263,224, Appeal Brief filed Sep. 19, 2007, 25 pgs.
U.S. Appl. No. 10/263,224, Final Office Action mailed Jun. 25, 2007, 9 pgs.
U.S. Appl. No. 10/263,224, Final Office Action mailed Aug. 1, 2005, 11 pgs.
U.S. Appl. No. 10/263,224, Non Final Office Action mailed Jan. 26, 2006, 12 pgs.
U.S. Appl. No. 10/263,224, Non Final Office Action mailed Mar. 8, 2005, 19 pgs.
U.S. Appl. No. 10/263,224, Non Final Office Action mailed Jun. 19, 2006, 16 pgs.
U.S. Appl. No. 10/263,224, Non Final Office Action mailed Dec. 13, 2006, 11 pgs.
U.S. Appl. No. 10/263,224, Reply Brief filed Jan. 17, 2008, 5 pgs.
U.S. Appl. No. 10/263,224, Response filed Mar. 9, 2006 to Non Final Office Action mailed Jan. 26, 2006, 15 pgs.
U.S. Appl. No. 10/263,224, Response filed Mar. 13, 2007 to Non Final Office Action mailed Dec. 13, 2006, 13 pgs.
U.S. Appl. No. 10/263,224, Response filed May 6, 2005 to Non Final Office Action mailed Mar. 8, 2005, 14 pgs.
U.S. Appl. No. 10/263,224, Response filed Sep. 18, 2006 to Non Final Office Action mailed Jun. 19, 2006, 14 pgs.
U.S. Appl. No. 10/263,224, Response filed Nov. 14, 2005 to Final Office Action mailed Aug. 1, 2005, 15 pgs.
U.S. Appl. No. 10/666,681, Advisory Action mailed Jul. 3, 2006, 2 pgs.
U.S. Appl. No. 10/666,681, Advisory Action mailed Oct. 7, 2009, 3 pgs.
U.S. Appl. No. 10/666,681, Appeal Brief filed Jan. 22, 2010, 18 pgs.
U.S. Appl. No. 10/666,681, Appeal Brief filed Jun. 25, 2007, 15 pgs.
U.S. Appl. No. 10/666,681, Appeal Brief filed Dec. 4, 2009, 18 pgs.
U.S. Appl. No. 10/666,681, Appeal Brief mailed Oct. 18, 2006, 11 pgs.
U.S. Appl. No. 10/666,681, Final Office Action mailed Apr. 18, 2006, 9 pgs.
U.S. Appl. No. 10/666,681, Final Office Action mailed Jul. 15, 2009, 8 pgs.
U.S. Appl. No. 10/666,681, Non Final Office Action mailed Nov. 16, 2005, 17 pgs.

(56) References Cited

OTHER PUBLICATIONS

U.S. Appl. No. 10/666,681, Pre-Appeal Brief Request filed Jul. 18, 2006, 3 pgs.
U.S. Appl. No. 10/666,681, Response filed Jan. 30, 2006 to Non Final Office Action mailed Nov. 16, 2005, 7 pgs.
U.S. Appl. No. 10/666,681, Response filed Jun. 19, 2006 to Final Office Action mailed Apr. 18, 2006, 8 pgs.
U.S. Appl. No. 10/666,681, Response filed Jul. 21, 2005 to Restriction Requirement mailed Jun. 21, 2005, 9 pgs.
U.S. Appl. No. 10/666,681, Response filed Sep. 15, 2009 to Final Office Action mailed Jul. 15, 2009, 8 pgs.
U.S. Appl. No. 10/666,681, Restriction Requirement mailed Jun. 21, 2005, 6 pgs.
U.S. Appl. No. 10/689,970 Supplemental Notice of Allowability Mailed Jul. 26, 2010, 6.
U.S. Appl. No. 10/689,970, Appeal Brief filed Jun. 28, 2007, 26 pgs.
U.S. Appl. No. 10/689,970, Examiner's Answer mailed Oct. 2, 2007, 14 pgs.
U.S. Appl. No. 10/689,970, Final Office Action mailed Jan. 25, 2007, 18 pgs.
U.S. Appl. No. 10/689,970, Non Final Office Action mailed Jun. 13, 2006, 14 pgs.
U.S. Appl. No. 10/689,970, Notice of Allowance mailed Jan. 20, 2010, 9 pgs.
U.S. Appl. No. 10/689,970, Notice of Allowance mailed Jun. 29, 2010, 6 pgs.
U.S. Appl. No. 10/689,970, Reply Brief filed Dec. 3, 2007, 10 pgs.
U.S. Appl. No. 10/689,970, Response filed Oct. 13, 2006 to Non Final Office Action mailed Jun. 13, 2006, 11 pgs.
U.S. Appl. No. 10/877,806 Final Office Action mailed Jul. 8, 2010, 9.
U.S. Appl. No. 10/877,806, Advisory Action mailed Mar. 11, 2009, 3 pgs.
U.S. Appl. No. 10/877,806, Final Office Action mailed Dec. 18, 2008, 8 pgs.
U.S. Appl. No. 10/877,806, Non-Final Office Action mailed Jun. 11, 2009, 8 pgs.
U.S. Appl. No. 10/877,806, Non-Final Office Action mailed Jun. 12, 2008, 14 pgs.
U.S. Appl. No. 10/877,806, Preliminary Amendment filed May 4, 2005, 9 pgs.
U.S. Appl. No. 10/877,806, Response filed Feb. 17, 2009 to Dec. 18, 2008, 9 pgs.
U.S. Appl. No. 10/877,806, Response filed Mar. 19, 2008 to Restriction Requirement mailed Feb. 19, 2008, 7 pgs.
U.S. Appl. No. 10/877,806, Response filed Apr. 8, 2010 to Non Final Office Action mailed Jan. 8, 2010, 11 pgs.
U.S. Appl. No. 10/877,806, Response filed Sep. 11, 2009 to Non Final Office Action mailed Jun. 11, 2009, 9 pgs.
U.S. Appl. No. 10/877,806, Response filed Sep. 12, 2008 to Non-Final Office Action mailed Jun. 12, 2008, 10 pgs.
U.S. Appl. No. 10/877,806, Restriction Requirement mailed Feb. 19, 2008, 7 pgs.
U.S. Appl. No. 11/323,486, Advisory Action mailed Feb. 9, 2010, 4 pgs.
U.S. Appl. No. 11/323,486, Final Office Action mailed Oct. 7, 2008, 34 pgs.
U.S. Appl. No. 11/323,486, Final Office Action mailed Nov. 17, 2009, 33 pgs.
U.S. Appl. No. 11/323,486, Non-Final Office Action mailed Mar. 17, 2009, 33 pgs.
U.S. Appl. No. 11/323,486, Non-Final Office Action mailed May 3, 2010, 37 pgs.
U.S. Appl. No. 11/323,486, Response filed Jan. 7, 2009 to Final Office Action mailed Oct. 7, 2008, 11 pgs.
U.S. Appl. No. 11/323,486, Response filed Jan. 18, 2010 to Final Office Action mailed Nov. 17, 2009, 14 pgs.
U.S. Appl. No. 11/323,486, Response filed Jun. 11, 2008 to Non-Final Office Action mailed Jan. 11, 2008, 17 pgs.
U.S. Appl. No. 11/323,486, Response filed Jul. 17, 2009 to Non Final Office Action mailed Mar. 17, 2009, 12 pgs.
U.S. Appl. No. 11/869,290, Response filed Apr. 26, 2010 to Non Final Office Action mailed Dec. 24, 2009, 17 pgs.
Australia Application No. 2006262446, Examiner Report mailed on Mar. 20, 2009, 3 pgs.
Australian Application No. 2006262446, Examiner Report Mailed Jan. 15, 2010, 2 pgs.
International Application Serial No. PCT/US03/33294, International Preliminary Report on Patentability mailed Jan. 30, 2006, 4 pgs.
International Application Serial No. PCT/US03/33294, International Search Report mailed Jun. 14, 2005, 8 pgs.
International Application Serial No. PCT/US03/33294, Written Opinion mailed Sep. 28, 2005, 4 pgs.
International Application Serial No. PCT/US2006/023807, International Preliminary Report on Patentability mailed Jan. 10, 2008, 5 pgs.
International Application Serial No. PCT/US2006/023807, International Search Report and Written Opinion mailed Feb. 28, 2007, 9 pgs.
Andale Gallery, "Andale", www.andale.com/corp/products/gallery.jsp,(Printed May 21, 2002).
Ardissono, Liliana, et al., "Tailoring the Interaction With Users in Electronic Shops", *Proceedings of the Seventh International Conference on User Modeling*, Banff, Canada, (1999),35-44.
Balabanovic, Marko, "An Adaptive Web Page Recommendation Service", *Stanford University Digital Libraries Project Working Paper*, Proceedings of the First International Conference on Autonomous Agents,(1999),378-385.
Breese, John S., et al., "Empirical Analysis of Predictive Algorithms for Collaborative Filtering", *Technical Report MSR-TR-98-12—Microsoft Research*, (May 1998—Revised Oct. 1998),1-21.
Burke, Robin, "The Wasabi Personal Shopper: a case-based recommender system", *Proceedings of the Sixteenth National Conference on Artificial Intelligence and the Eleventh Innovative Applications of Artificial Intelligence Conference Innovative Applications of Artificial Intelligence*, (1999),844-849.
Changchien, S, "Mining association rules procedure to support online recommendation by customers and product fragmentation", *Expert Systems with Application*, 20(4), (May 2001),325-335.
Cheung, N., "Buy this! [e-commerce recommendation software]", *Information Age*, (Feb. 2001),33-4.
Cheung, W., "Mining customer preference ratings for product recommendation using the support vector machine and the latent class model", *Proceedings of the 2nd International Conference on Data Mining Methods and Databases for Engineering, Finance and Other Fields*, Cambridge, UK, (Jul. 2000),601-10.
Chien, Yi-Ying, "A personalized Internet shopping agent", *Proceedings of the International Conference on Parallel and Distributed Processing Techniques and Applications*. PDPTA'2000, pt. 4, (2000),1849-55.
Chun, In-Gook, et al., "The implementation of knowledge-based recommender system for electronic commerce using Java expert system library", *International Symposium on Industrial Electronics, 2001. Proceedings. ISIE 2001*, vol. 3, (Jun. 12-16, 2001),1766-1770.
Claypool, Mark, et al., "Inferring User Interest", *Computer Science Technical Report Series*, (Aug. 31, 2001),1-17.
Cotlier, Moira, "The Electronic Catalog: Upselling Online Can Raise Top Line", *Catalog Age*, 18(7), (Jun. 1, 2001),93.
Demiriz, Ayhan, "Enhancing Product Recommender Systems on Sparse Binary Data", *E-Buisiness Department, Verizon Inc.*, (2002),1-17.
Ebizautos, "eBay Motors Auction Management System for Auto & Motorcycle Dealers", [Online]. Retrieved from the Internet: <URL: http://www.ebizautos.com/>,(Copyright 2001-2005),Web Page.
Flynn, B., "Next Hot Web Play? Precision Targeting", *Brandweek*, 42(i8), Proquest #68864267.,(Feb. 19, 2001),21(3pgs).
Greco, Carl, "What you should know before joining an Internet Mall", *Direct Marketing*, 61(10), (Feb. 1999),42-3.
Harvey, L, ""On Birthdays" mortgages, ice cream sundaes, and term life. How personalization and cross selling tools provide cross-selling in the enterprise", *E-business Strategies & Solutions*, (Jul. 1999),31-5.
Hirooka, Yasuo, et al., "Extending Content-Based Recommendation by Order-Matching and Cross-Matching Methods", *Lecture Notes in*

(56) References Cited

OTHER PUBLICATIONS

*Computer Science; vol. 1875, Proceedings of the First International Conference on Electronic Commerce and Web Technologies*, (2000),177-90.

Hirooka, Y, et al., "Recommending books of revealed and latent interests in e-commerce", *Industrial Electronics Society, 2000. IECON 2000. 26th Annual Conference of the IEEE*, vol. 3, (2000),1632-1637.

Hong, Se J., et al., "A New Approach for Item Choice Recommendations", *Proceedings of the Third International Conference on Data Warehousing and Knowledge Discovery*, (2001),131-140.

Iacobucci, Dawn, "Recommendation Agents on the Internet", *Journal of Interactive Marketing*, 14(3), (2000),2-11.

IBM, "WebSphere Commerce Professional Edition", *Features at Glance*, www-3.ibm.com/software/webservers/commerce/wc_pe/morefeatures.html,(Printed May 21, 2002),1 page.

Kumar, Ravi, "Recommendation Systems: A Probabilistic Analysis", *Journal of Computer and System Sciences*, 63(1), (Aug. 2001),42-61.

Kwak, Mira, "Collaborative filtering with automatic rating for recommendation", *IEEE International Symposium on Industrial Electronics, 2001. Proceedings. ISIE 2001*, vol. 1, (Jun. 12-16, 2001),625-628.

Kwak, Mary, "Web Sites Learn to Make Smarter Suggestions", *MIT Sloan Management Review*, 42(4), (Summer 2001),17.

Kyeonah, Yu, "Improving the performance of collaborative recommendation by using multi-level similarity computation", *Artificial Intelligence and Soft Computing: Proceedings of the IASTED International Conference,*, (Jul. 24-26, 2000),241-5.

Lee, Wee S., "Collaborative Learning for Recommender Systems", *Proceedings of the Eighteenth International Conference on Machine Learning*, (2001),314-321.

Lin, Weiyang, et al., "Efficient Adaptive-Support Association Rule Mining for Recommender Systems", *Data Mining and Knowledge Discovery*, 6(1), (2001),83-105.

Loney, Fred N., "Faceted Preference Matching in Recommender Systems", *Proceedings of the Second International Conference on Electronic Commerce and Web Technologies*, (2001),295-304.

Maes, Pattie, et al., "Agents that Buy and Sell", *Communications of the ACM*, 42(3), (Mar. 1999),81-91.

Maes, Pattie, et al., "Agents that Buy and Sell:", *Transforming Commerce as we Know it*, 1998 MIT Media Laboratory. Submitted to the Communications of the ACM, Mar. 1999 Issue, (1998),12 pgs.

McAllister, Neil, "Getting Personal", *New Architect*, (Nov. 2001),1-8.

McDonald, David W., et al., "Expertise Recommender: A Flexible Recommendation System and Architecture", *Department of Information and Computer Science, University of California*, Irvine, CA, 10 pgs.

Nextag, "Computer Letter, Private Profiles—NexTag—of all the auction sites on the Web, here's one an economist might like", [Online]. Retrieved from the Internet: <URL: http://www.nextag.com/serv/main/about/computer/letter.html>,(Aug. 23, 1999).

Pedersen, P., "Behavioral Effects of Using Software Agents for Product and Merchant Brokering: An Experimental Study of Consumer Decision-Making", *International Journal of Electronic Commerce*, 5(1), (Fall 2000),125-141.

Pennock, David M., "Social Choice Theory and Recommender Ststems:", *Analysis of the Axiomatic Foundations of Collaborative Filtering*, In the preceedings of the Seventeenth National Conference on Artifical Intelligence (AAA1-2000),(2000),6 pgs.

Pennock, David M., et al., "Social Choice Theory and Recommender Systems: Analysis of the Axiomatic Foundations of Collaborative Filtering", *Proceedings of the Seventeenth National Conference on Artificial Intelligence and Twelfth Conference on Innovative Applications of Artificial Intelligence*, (2000),729-734.

Ramakrishnan, N, et al., "Privacy risks in recommender systems", *IEEE Internet Computing*, 5(6), (Nov.-Dec. 2001),54-63.

Roe, Andy, "Amazon Adds Seller Services", Accessed through following address—http://web.archive.org/web/20000816024400/http://www.auctionwatch.com/awdaily/dailynews/august99/3-081899.html,(Aug. 18, 1999),Web Page.

Sarwar, B., et al., "Analysis of recommendation algorithms for e-commerce", *Proceedings of the 2nd ACM conference on EC*, (2000),158-167.

Sarwar, Badrul, et al., "Item-based Collaborative Filtering Recommendation Algorithms", *WWW10 Conference*, (May 1-5, 2001),1-11.

Schafer, J, et al., "E-commerce recommendation applications", *Data Mining and Knowledge Discovery*, 5(1-2), (2001),115-153.

Schafer, J., et al., "E-Commerce Recommendation Applications", *GroupLens Research Project, Dept. of Computer Science & Engineering, University of Minnesota, Minneapolis*, (2001),1-24.

Schafer, J. B., et al., "Recommender Systems in E-Commerce", *Department of Science and Engineering—University of Michigan*, (2001),1-9.

Schien, Andrew I., et al., "Methods and Metrics for Cold-Start Recommendations", *Proceedings of the 25th Annual International ACM SIGIR Conference on Research and Development in Information Retrieval (SIGIR 2002)*, (2002),1-9.

Schubert, Petra, "Virtual Communities of Transaction:the Role of Personalization in Electronic Commerce", *Electronic Markets Journal*, 10(1), (2000),1-13.

Seitz, Juergen, et al., "Impacts of Software Agents in E-Commerce Systems on Customer?s Loyalty and on Behavior of Potential Customers", Chapter 13 from *Strategies for eCommerce Success:* by Bijan Fazlollahi, IRM Press,(2000),9 pgs.

Towle, Brendon, et al., "Knowledge Based Recommender Systems Using Explicit User Models", *Knowledge Based Electronic Markets*, (2000),74-7.

Tran, T., "Hybrid Recommender Systems for Electronic Commerce", *Proceedings of the Seventeenth National Conference on Artificial Intelligence (AAAI-00) Workshop on Knowledge-Based Electronic Markets*, (2000),78-84.

Websphere, "WebSphere Commerce Professional Edition—Features", [Online]. Retrieved from the Internet: <URL: http://www-306.ibm.com/software/genservers/commerce/wcpe/>,(Downloaded Apr. 21, 2005),Webpage.

Wilder, C, et al., "E-Commerce Emerges", *Information Week*, No. 584, (Jun. 17, 1996),14-15.

U.S. Appl. No. 10/877,806, Examiner's Answer mailed Apr. 4, 2011, 10 pgs.

U.S. Appl. No. 11/323,486, Advisory Action mailed Jul. 29, 2011, 3 pgs.

U.S. Appl. No. 11/323,486, Final Office Action mailed Mar. 23, 2011, 46 pgs.

U.S. Appl. No. 11/323,486, Response filed Jun. 23, 2011 to Final Office Action mailed Mar. 23, 2011, 18 pgs.

U.S. Appl. No. 11/869,290, Notice of Allowance mailed Aug. 22, 2011, 6 pgs.

U.S. Appl. No. 12/870,022, Response filed Sep. 13, 2011 to Final Office Action mailed Jul. 28, 2011, 13 pgs.

U.S. Appl. No. 12/870,022, Final Office Action mailed Jul. 28, 2011, 15 pgs.

U.S. Appl. No. 12/870,022, Non Final Office Action mailed Mar. 17, 2011, 13 pgs.

U.S. Appl. No. 12/870,022, Response filed Jun. 3, 2011 to Non Final Office Action mailed Mar. 17, 2011, 16 pgs.

Australian Application Serial No. 2010202828, First Examiner Report mailed Apr. 20, 2011, 1 pg.

European Application Serial No. 06773535.7, EP Search Report, 13 pgs.

Japanese Application Serial No. 2008-517212, Office Action mailed Apr. 12, 2011, 6 pgs.

"Query—Definition by Dictionary.com", [Online]. Retrieved from the Internet: <http://dictionary.reference.com/browse/query>, (Accessed 2011), 1 pg.

U.S. Appl. No. 10/263,224, Examiner Interview Summary mailed May 23, 2012, 10 pgs.

U.S. Appl. No. 10/263,224, Non Final Office Action mailed Feb. 28, 2012, 11 pgs.

U.S. Appl. No. 10/263,224, Notice of Allowance mailed May 23, 2012, 5 pgs.

(56) References Cited

OTHER PUBLICATIONS

U.S. Appl. No. 10/263,224, Response filed May 3, 2012 to Non Final Office Action mailed Feb. 28, 2012, 14 pgs.
U.S. Appl. No. 10/666,681, Decision on Pre-Appeal Brief Request mailed Aug. 16, 2006, 2 pgs.
U.S. Appl. No. 10/666,681, Examiner's Answer to Appeal Brief mailed Apr. 15, 2010, 9 pgs.
U.S. Appl. No. 10/666,681, Non Final Office Action mailed Apr. 17, 2012, 10 pgs.
U.S. Appl. No. 10/877,806, Appeal Brief filed Dec. 7, 2010, 32 pgs.
U.S. Appl. No. 10/877,806, Preliminary Amendment filed May 6, 2005, 9 pgs.
U.S. Appl. No. 10/877,806, Reply Brief filed Jun. 3, 2011, 6 pgs.
U.S. Appl. No. 11/323,486, Examiner Interview Summary mailed Feb. 8, 2012, 1 pg.
U.S. Appl. No. 11/323,486, Notice of Allowance Mailed Feb. 8, 2012, 19 pgs.
U.S. Appl. No. 11/323,486, Notice of Allowance mailed Mar. 6, 2012, 9 pgs.
U.S. Appl. No. 11/323,486, Response Filed Feb. 15, 2012 to Notice of Allowance mailed Feb. 8, 2012, 8 pgs.
U.S. Appl. No. 12/870,022, Advisory Action mailed Jan. 19, 2012, 3 pgs.
U.S. Appl. No. 12/870,022, Appeal Brief filed Jan. 10, 2012, 23 pgs.
Australian Application Serial No. 2012200347, Office Action mailed Mar. 15, 2012, 2 pgs.
Australian Application Serial No. 2012200347, Response filed May 14, 2012 to Examiner's Report mailed Mar. 15, 2012, 9 pgs.
Chinese Application Serial No. 200680022268.9, Office Action mailed Mar. 23, 2012, 7 pgs.
U.S. Appl. No. 11/323,486, Response filed Jan. 3, 2011 to Non Final Office Action mailed Oct. 1, 2010, 14 pgs.
U.S. Appl. No. 11/869,290, Response filed Nov. 8, 2010 to Final Office Action mailed Jul. 8, 2010, 19 pgs.
Australian Application Serial No. 2006262446, Response filed Dec. 24, 2009 to Examiner Report mailed Mar. 20, 2009, 24 pgs.
Australian Application Serial No. 2006262446, Response filed Mar. 23, 2010 to Examiner Report mailed Jan. 15, 2010, 25 pgs.
Chinese Application Serial No. 200680022268.9, Office Action Received Jan. 7, 2011, 17 pgs.
Chinese Application Serial No. 200680022268.9, Office Action Received Aug. 11, 2009, 30 pgs.
Chinese Application Serial No., Response filed Feb. 9, 2011 to Non Final Office Action mailed Nov. 17, 2010, 40 pgs.
Japanese Application Serial No. 2008-517212, Office Action Response Filed Oct. 28, 2010, 23 pgs.
U.S. Appl. No. 09/769,546, Advisory Action mailed Mar. 15, 2007, 3 pgs.
U.S. Appl. No. 09/769,546, Final Office Action mailed Jan. 9, 2009, 6 pgs.
U.S. Appl. No. 09/769,546, Final Office Action mailed Dec. 1, 2006, 5 pgs.
U.S. Appl. No. 09/769,546, Non Final Office Action mailed Apr. 6, 2005, 8 pgs.
U.S. Appl. No. 09/769,546, Non Final Office Action mailed May 16, 2007, 8 pgs.
U.S. Appl. No. 09/769,546, Non-Final Office Action mailed Jun. 27, 2008, 5 pgs.
U.S. Appl. No. 09/769,546, Reply Brief Filed Sep. 10, 2009 to Examiner's Answer mailed Jul. 10, 2009, 6 pgs.
U.S. Appl. No. 09/769,546, Response filed Feb. 7, 2008 to Final Office Action mailed Nov. 16, 2007, 10 pgs.
U.S. Appl. No. 09/769,546, Response filed Feb. 24, 2009 to Final Office Action mailed Jan. 9, 2009, 10 pgs.
U.S. Appl. No. 09/769,546, Response filed Mar. 1, 2007 to Final Office Action mailed Dec. 1, 2006, 9 pgs.
U.S. Appl. No. 09/769,546, Response filed Apr. 9, 2009 to Advisory Action mailed Mar. 19, 2009, 21 pgs.
U.S. Appl. No. 09/769,546, Response filed Jun. 9, 2005 to Non Final Office Action mailed Apr. 6, 2005, 11 pgs.
U.S. Appl. No. 09/769,546, Response filed Aug. 15, 2007 to Non Final Office Action mailed May 16, 2007, 9 pgs.
U.S. Appl. No. 09/769,546, Response filed Sep. 29, 2008 to Non-Final Office Action mailed Jun. 27, 2008, 14 pgs.
U.S. Appl. No. 10/666,681, Final Office Action mailed Nov. 7, 2012, 10 pgs.
U.S. Appl. No. 10/666,681, Pre-Appeal Brief Request mailed Oct. 14, 2009, 5 pgs.
U.S. Appl. No. 10/666,681, Response filed Jul. 17, 2012 to Non Final Office Action mailed Apr. 17, 2012, 12 pgs.
U.S. Appl. No. 10/877,806, Non-Final Office Action mailed Jan. 8, 2010, 9 pgs.
U.S. Appl. No. 10/944,070, Advisory Action mailed Aug. 4, 2010, 4 pgs.
U.S. Appl. No. 10/944,070, Final Office Action mailed Jan. 9, 2009, 18 pgs.
U.S. Appl. No. 10/944,070, Final Office Action mailed May 27, 2010, 18 pgs.
U.S. Appl. No. 10/944,070, Non-Final Office Action mailed Apr. 16, 2009, 31 pgs.
U.S. Appl. No. 10/944,070, Non-Final Office Action mailed Jul. 23, 2008, 16 pgs.
U.S. Appl. No. 10/944,070, Non-Final Office Action mailed Nov. 27, 2009, 19 pgs.
U.S. Appl. No. 10/944,070, Response filed Mar. 1, 2010 to Non Final Office Action mailed Nov. 27, 2009, 24 pgs.
U.S. Appl. No. 10/944,070, Response filed Mar. 9, 2009 to Final Office Action mailed Jan. 9, 2009, 28 pgs.
U.S. Appl. No. 10/944,070, Response filed Jul. 16, 2009 to Non Final Office Action mailed Apr. 16, 2009, 28 pgs.
U.S. Appl. No. 10/944,070, Response filed Jul. 27, 2010 to Final Office Action mailed May 27, 2010, 26 pgs.
U.S. Appl. No. 10/944,070, Response filed Oct. 23, 2008 to Non-Final Office Action mailed Jul. 23, 2008, 22 pgs.
U.S. Appl. No. 11/323,486, Non-Final Office Action mailed Jan. 11, 2008, 22 pgs.
U.S. Appl. No. 11/323,486, Response filed Mar. 17, 2010 to Advisory Action mailed Feb. 9, 2010, 12 pgs.
U.S. Appl. No. 11/323,486, Response filed Jul. 9, 2010 to Non Final Office Action mailed May 3, 2010, 14 pgs.
U.S. Appl. No. 11/679,973, Advisory Action mailed Nov. 23, 2009, 3 pgs.
U.S. Appl. No. 11/679,973, Final Office Action mailed Aug. 21, 2009, 13 pgs.
U.S. Appl. No. 11/679,973, Non Final Office Action mailed Mar. 18, 2009, 11 pgs.
U.S. Appl. No. 11/679,973, Notice of Allowance mailed Jun. 9, 2010, 17 pgs.
U.S. Appl. No. 11/679,973, Pre-Appeal Brief Request filed Dec. 21, 2009, 5 pgs.
U.S. Appl. No. 11/679,973, Response filed Jun. 12, 2009 to Non Final Office Action mailed Mar. 18, 2009, 12 pgs.
U.S. Appl. No. 11/869,290, Final Office Action mailed Jul. 8, 2010, 27 pgs.
U.S. Appl. No. 11/869,290, Non-Final Office Action mailed Dec. 24, 2009, 29 pgs.
U.S. Appl. No. 12/870,022, Examiner's Answer to Appeal Brief mailed May 29, 2012, 13 pgs.
U.S. Appl. No. 12/870,022, Reply Brief filed Jul. 30, 2012, 3 pgs.
U.S. Appl. No. 13/485,002, Final Office Action mailed Sep. 14, 2012, 28 pgs.
U.S. Appl. No. 13/565,661, Non Final Office Action mailed Dec. 5, 2012, 10 pgs.
U.S. Appl. No. 13/485,002, Response filed Dec. 14, 2012 to Non Final Office Action mailed Sep. 14, 2012, 10 pgs.
Australian Application Serial No. 2012200347, Examiner's Report mailed Jul. 19, 2012, 3 pgs.
Chinese Application Serial No. 200680022268.9, Office Action mailed Nov. 17, 2010, with English translation, 7 pgs.
Chinese Application Serial No. 200680022268.9, Notice of Decision to Grant mailed Nov. 30, 2012, with English translation, 5 pgs.
Chinese Application Serial No. 200680022268.9, Office Action mailed Jun. 26, 2009, with English translation of claims, 28 pgs.

(56) References Cited

OTHER PUBLICATIONS

Chinese Application Serial No. 200680022268.9, Response filed Nov. 11, 2009 to Office Action mailed Jun. 26, 2009, with English translation of claims, 29 pgs.

"eBizAutos: It All About the Cars", [Online]. Retrieved from the Internet: <URL: http://www.ebizautos.com/>, (Accessed Apr. 15, 2005), 2 pgs.

European Application Serial No. 06773535.7, Office Action mailed May 13, 2011, 2 pgs.

European Application Serial No. 06773535.7, Response filed Mar. 1, 2012 to Office Action mailed May 13, 2011, 22 pgs.

International Application Serial No. PCT/US2006/23807, Written Opinion mailed Feb. 28, 2007, 3 pgs.

Japanese Application Serial No. 2008-517212, Office Action mailed Aug. 3, 2010, with English translation of claims, 12 pgs.

Japanese Application Serial No. 2008-517212, Office Action Response filed Jun. 24, 2011, with English translation of claims, 25 pgs.

Andale Gallery, "Gallery—Cross Sell More Items", Copyright© 1999-2005 Andale Inc., [Online]. Retrieved from the Internet: <URL: http://cms.andale.com/corp/products/gallery.jsp (also http://cms.andale.com/auction/gallery.html)> Accessed on Web Apr. 15, 2005, 5 pgs.

Andale Gallery, "Prominently Featured on Your Listings", Copyright© 2001 Andale, Inc., [Online]. Retrieved from the Internet: <URL: http://www.andale.com/corp/tour/gal_tour4.html> Accessed on Web—Apr. 15, 2005, 1 pg.

Ansari, A., "Internet Recommendation System", Journal of Marketing Research, vol. 37(3), Proquest #57914570, (Aug. 2000), 13 pgs.

Kanemoto, H, "Web Customer Action Analysis System", Matsushita Technical Journal, 48(1), (Feb. 2002), 26-29.

Karypis, George, "Evaluation of Item-Based Top-N Recommendation Algorithms", Technical Report #00-046, http://www-users.cs.umn.edu/~karypis/publications/Papers/PDF/itemrs.pdf, (2000), 1-13.

Kitts, Brendan, et al., "Cross-sell: A Fast Promotion-Tunable Customer-item Recommendation Method Based on Conditionally Independent Probabilities", Proceedings of the sixth ACM SIGKDD international conference on Knowledge discovery and data mining, Boston, MA USA, (Aug. 2000), 437-446.

Kohrs, Arnd, et al., "Using category-based collaborative filtering in the Active WebMuseum", 2000 IEEE International Conference on Multimedia and Expo, 2000. ICME 2000, vol. 1, (Jul. 30-Aug. 2, 2000), 351-354.

McDonald, D W, "Expertise recommender: a flexible recommendation system and architecture", Proceedings of the 2000 ACM conference on Computer supported cooperative work, (2000), 231-240.

Ohkubo, M., et al., "Extracting Information Demand by Analyzing a WWW Search Log", Transactions of Information Processing Society of Japan, 39(7), (Jul. 15, 1998), 2250-2258.

U.S. Appl. No. 10/666,681, Advisory Action mailed Jan. 11, 2013, 3 pgs.

U.S. Appl. No. 10/666,681, Decision on Pre-Appeal Brief Request mailed Mar. 18, 2013, 2 pgs.

U.S. Appl. No. 10/666,681, Non Final Office Action mailed Jun. 20, 2013, 10 pgs.

U.S. Appl. No. 10/666,681, Pre-Appeal Brief Request for Review mailed Feb. 1, 2013, 5 pgs.

U.S. Appl. No. 10/666,681, Response filed Dec. 27, 2012 to Final Office Action mailed Nov. 7, 2012, 16 pgs.

U.S. Appl. No. 13/247,798, Non Final Office Action mailed Apr. 2, 2013, 8 pgs.

U.S. Appl. No. 13/247,798, Response filed Jul. 2, 2013 to Non Final Office Action mailed Apr. 2, 2013, 10 pgs.

U.S. Appl. No. 13/485,002 , Response filed May 13, 2013 to Final Office Action mailed Feb. 14, 2013, 12 pgs.

U.S. Appl. No. 13/485,002, Final Office Action mailed Feb. 14, 2013, 32 pgs.

U.S. Appl. No. 13/485,002, Non Final Office Action mailed Jun. 10, 2013, 31 pgs.

U.S. Appl. No. 13/565,661, Non Final Office Action mailed Jun. 4, 2013, 14 pgs.

U.S. Appl. No. 13/565,661, Response filed Mar. 5, 2013 to Non Final Office Action mailed Dec. 5, 2012, 13 pgs.

Australian Application Serial No. 2012200347, Response filed Jan. 7, 2013 to Office Action mailed Jul. 19, 2012, 2 pgs.

India Application Serial No. 9703/DELNP/2007, First Examination Report mailed Feb. 22, 2013, 4 pgs.

Linden, G., et al., "Amazon.com recommendations: item-to-item collaborative filtering", IEEE Internet Computing, 7(1), (Jan.-Feb. 2003), 76-80.

U.S. Appl. No. 13/247,798, Notice of Allowance mailed Aug. 5, 2013, 7 pgs.

U.S. Appl. No. 10/666,681, Response filed Sep. 20, 2013 to Non Final Office Action mailed Jun. 20, 2013, 12 pgs.

U.S. Appl. No. 13/485,002, Response filed Sep. 10, 2013 to Non Final Office Action mailed Jun. 10, 2013, 13 pgs.

U.S. Appl. No. 13/565,661, Response filed Sep. 4, 2013 to Non Final Office Action mailed Jun. 4, 2013, 10 pgs.

\* cited by examiner

More Items You May Like

Items are updated regularly. Check back often for new suggestions.

| Picture | Item Title | Price | # of Bids | Time Left | All item details |
|---|---|---|---|---|---|
| | DIANA KRALL: THE LOOK OF LOVE on CD NEW SEALED | US $7.40<br>US $9.00 | — —<br>=BuyitNow | 3d 13h 38m | Show me more |
| | SADE: LOVERS LIVE on CD NEW SEALED | US $9.00 | =BuyitNow | 6d 22h 03m | Show me more |
| | THE CHIEFTAINS: The Wide World Over on CD NEW | US $7.40 | — — | 7d 02h 04m | Show me more |
| | SADE: LOVERS LIVE on CD NEW SEALED | US $9.00 | =BuyitNow | 8d 22h 03m | Show me more |
| | THE CHIEFTAINS: The Wide World Over on CD NEW | US $7.40 | — — | 9d 02h 04m | Show me more |

FIG. 13

Ranked Matching Term Table

166

User_ID
Item_Bid_On_ID
Item_Bid_On_Parent_Category
Popular_Search_Term
Popular_Search_Term_Ranking

FIG. 14D

Recommendation Query Table

168

User_ID
Relative_Lower_Boundary
Popular_Search_Term
Relative_Upper_Boundary

FIG. 14E

Recommendation Table

170

User_ID
Recommended_Item_ID

FIG. 14F

LISTING RECOMMENDATION USING GENERATION OF A USER-SPECIFIC QUERY IN A NETWORK-BASED COMMERCE SYSTEM

CROSS REFERENCE TO RELATED APPLICATION

This application is a continuation of U.S. patent application Ser. No. 10/689,970, filed Oct. 20, 2003 U.S. Pat. No. 7,831,476, which claims priority from U.S. Provisional Application Ser. No. 60/420,199, filed Oct. 21, 2002, all of which are incorporated by reference in their entireties herein.

FIELD OF THE INVENTION

The present invention relates generally to the field of electronic commerce, and more specifically to a method and system for generating listing recommendations to a user of a network-based commerce system.

BACKGROUND

More and more Internet users are realizing the ease and convenience of buying and selling online via a network-based commerce system. Certain such commerce systems are focused on person-to-person trading, and collectors, hobbyists, small dealers, unique listing seekers, bargain hunters, and other consumers, are able to buy and sell millions of listings at various online shopping sites. Such systems also support business-to-person and business-to-business commerce.

The success of a networked-based commerce system may depend upon its ability to provide a user-friendly environment in which buyers and sellers can conduct business efficiently. Current network-based commerce systems have certain limitations in the manner in which they present information to users.

SUMMARY OF THE INVENTION

According to one aspect of the invention, there is provided a method to facilitate generating listing recommendations to a user of a network-based commerce system. In one embodiment, the method includes identifying a term associated with a user interaction in a network-based commerce system. The method further includes generating a recommendation query including the identified term. In addition, the method includes running the recommendation query against a plurality of listings hosted by the network-based commerce system to identify a recommendation. Moreover, the method includes presenting the recommendation to a user of the network-based commerce system.

Other features of the invention will be apparent from the accompanying drawings and from the detailed description that follows.

BRIEF DESCRIPTION OF THE DRAWINGS

The invention is now described, by way of example, with reference to the accompanying diagrammatic drawings in which like reference numerals are used to indicate the same or similar features, unless otherwise indicated.

FIG. 13 is an exemplary graphic user interface providing recommended listings to the user.

FIGS. 14A-14F are exemplary data structures utilized in the generation of recommendation queries, according to an exemplary embodiment of the invention.

DETAILED DESCRIPTION

A method and system automatically to recommend listings in a network-based commerce system based on past user behaviour is described. In the following description, for purposes of explanation, numerous specific details are set forth in order to provide a thorough understanding of the invention. It will be evident, however, to one skilled in the art that the invention may be practiced without these specific details.

TERMINOLOGY

For the purposes of the present specification, the term "listing" or "item" may refer to any description, identifier, representation or information pertaining to a listing, service, offering or request that is stored within a network-based commerce system. As such, a listing may be an auction or fixed-price offering (e.g., products such as goods and/or services), an advertisement, or a request for a listing or service. The term "listing recommendation" may include an instance of a listing being presented by a network-based commerce system. The term "popular search term" may include any criteria, textual, numeric, visual, audible or otherwise, frequently submitted by users searching a network-based commerce system. For the purposes of this specification, the word "term" is synonymous with the word "phrase" and is also intended to include a plurality of words. Thus, "term" or "phrase" can be used to refer to any entry (or entries) a user enters into a search field when requesting a search of the network-based commerce system. The term "recommendation query" may include a query that is run to produce one or more listing recommendations. The term "term-category pair" (or phrase-category pair) may refer to a popular search term or phrase associated with a particular category. In one embodiment, the term-category pair is used to generate a recommendation query. The term "popularity threshold" may include a minimum rank that a popular search term must hold in a category to be considered sufficiently popular to be used in a recommendation query. The term "relative popularity boundary" may include a measurement of the limit for a popular search term from a particular starting point through a category structure. The term "show me more" link may include any link placed next to a listing recommendation in the network-based commerce system. In one embodiment, activating the link will execute a database query in real time using a recommended popular search term to locate all current listings associated with the popular search term. Thus, the "show me more" link may provide additional listing recommendations to a specific user.

Transaction Facility

Figure 1:
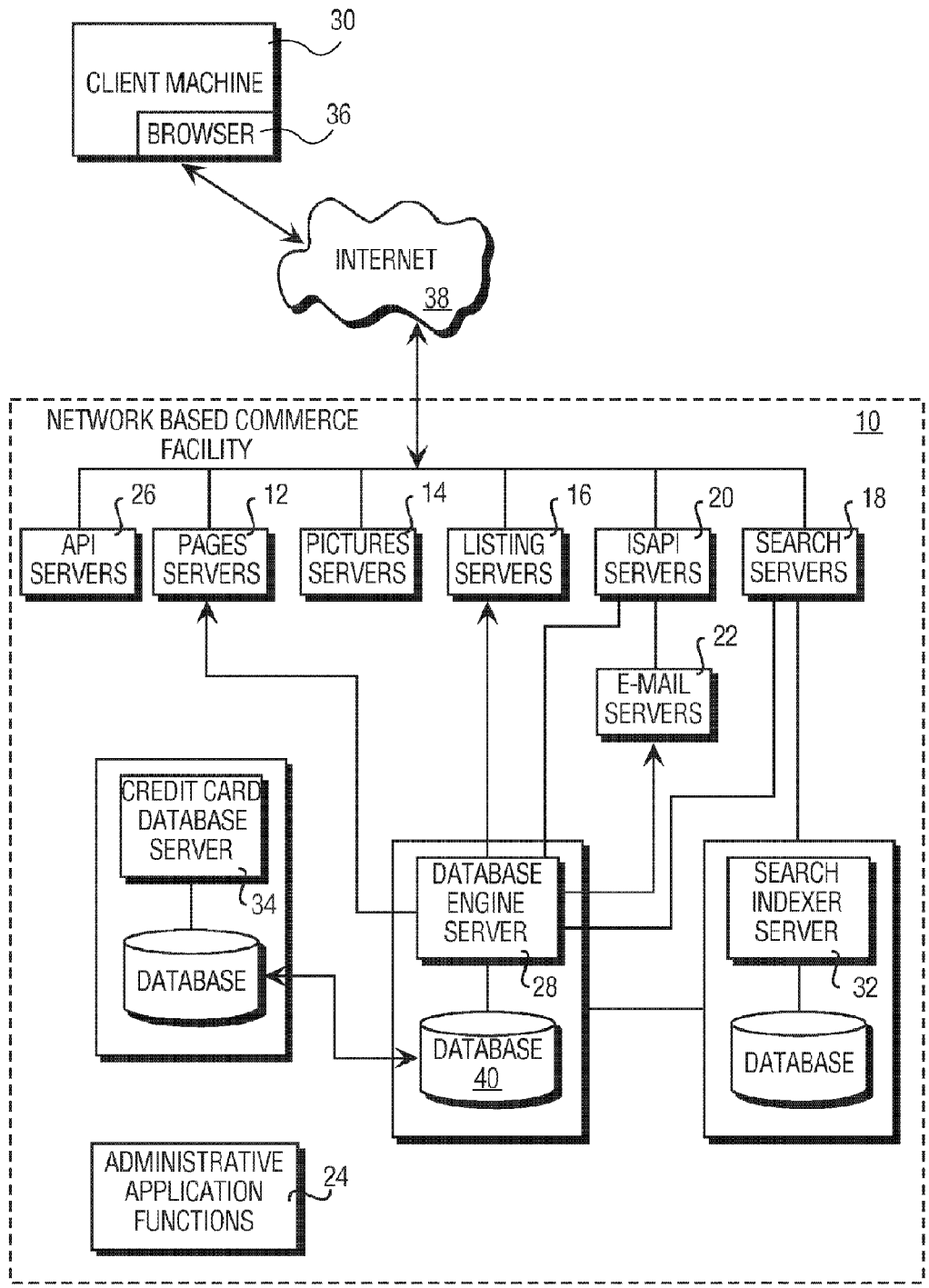
FIG. 1 is block diagram illustrating an exemplary network-based commerce system, in accordance with an aspect of the invention.

FIG. 1 is block diagram illustrating an exemplary network-based commerce system 10. While an exemplary embodiment of the present invention is described within the context of the network-based commerce system 10, the invention will find application in many different types of computer-based, and network-based, facilities (commerce, transaction or otherwise).

The network-based commerce system 10, includes one or more of a number of types of front-end servers that each includes at least one Dynamic Link Library (DLL) to provide selected functionality. The system 10 includes page servers 12 that deliver web pages (e.g., mark-up language documents), picture servers 14 that dynamically deliver images to be displayed within Web pages, listing servers 16 that facilitate category-based browsing of listings, search servers 18 that handle search requests to the system 10 and facilitate keyword-based browsing of listings, and ISAPI servers 20 that provide an intelligent interface to a back-end of the system 10. The system 10 also includes e-mail servers 22 that provide, inter alia, automated e-mail communications to users of the network-based commerce system 10. In one embodiment, one or more administrative application functions 24 facilitate monitoring, maintaining, and managing the system 10. One or more API servers 26 may provide a set of API functions for querying and writing to the network-based commerce system 10. APIs may be called through the HTTP transport protocol. In one embodiment, information is sent and received using a standard XML data format. Applications utilized to interact (e.g., upload transaction listings, review transaction listings, manage transaction listings, etc.) with the network-based commerce system 10 may be designed to use the APIs. Such applications may be in an HTML form or be a CGI program written in C++, Perl, Pascal, or any other programming language. Exemplary APIs are more fully described in co-pending U.S. patent application Ser. No. 09/999,618, herein incorporated by reference.

The page servers 12, API servers 26, picture servers 14, ISAPI servers 20, search servers 18, e-mail servers 22 and a database engine server 28 may individually, or in combination, act as a communication engine to facilitate communications between, for example, a client machine 30 and the network-based commerce system 10. In addition, the page servers 12, API servers 26, picture servers 14, ISAPI servers 20, search servers 18, e-mail servers 22 and database engine server 28 may individually, or in combination, act as a transaction engine to facilitate transactions between, for example, the client machine 30 and the network-based commerce system 10. Furthermore, the page servers 12, API servers 26, picture servers 14, ISAPI servers 20, search servers 18, e-mail servers 22 and database engine server 28 may individually, or in combination, act as a display engine to facilitate the display of listings on, for example, the client machine 30.

The back-end servers may include the database engine server 28, a search index server 32 and a credit card database server 34, each of which maintains and facilitates access to a respective database.

In one embodiment, the network-based commerce system 10 is accessed by a client program, such as for example a browser 36 (e.g., the Internet Explorer distributed by Microsoft Corp. of Redmond, Wash.) that executes on the client machine 30 and accesses the network-based commerce system 10 via a network such as, for example, the Internet 38. Other examples of networks that a client may utilize to access the network-based commerce system 10 include a wide area network (WAN), a local area network (LAN), a wireless network (e.g., a cellular network), the Public Switched Telephone Network (PSTN) network, or the like. The client program that executes on the client machine 30 may also communicate with the network-based commerce system 10 via the API servers 26.

Database Structure

Figure 2:
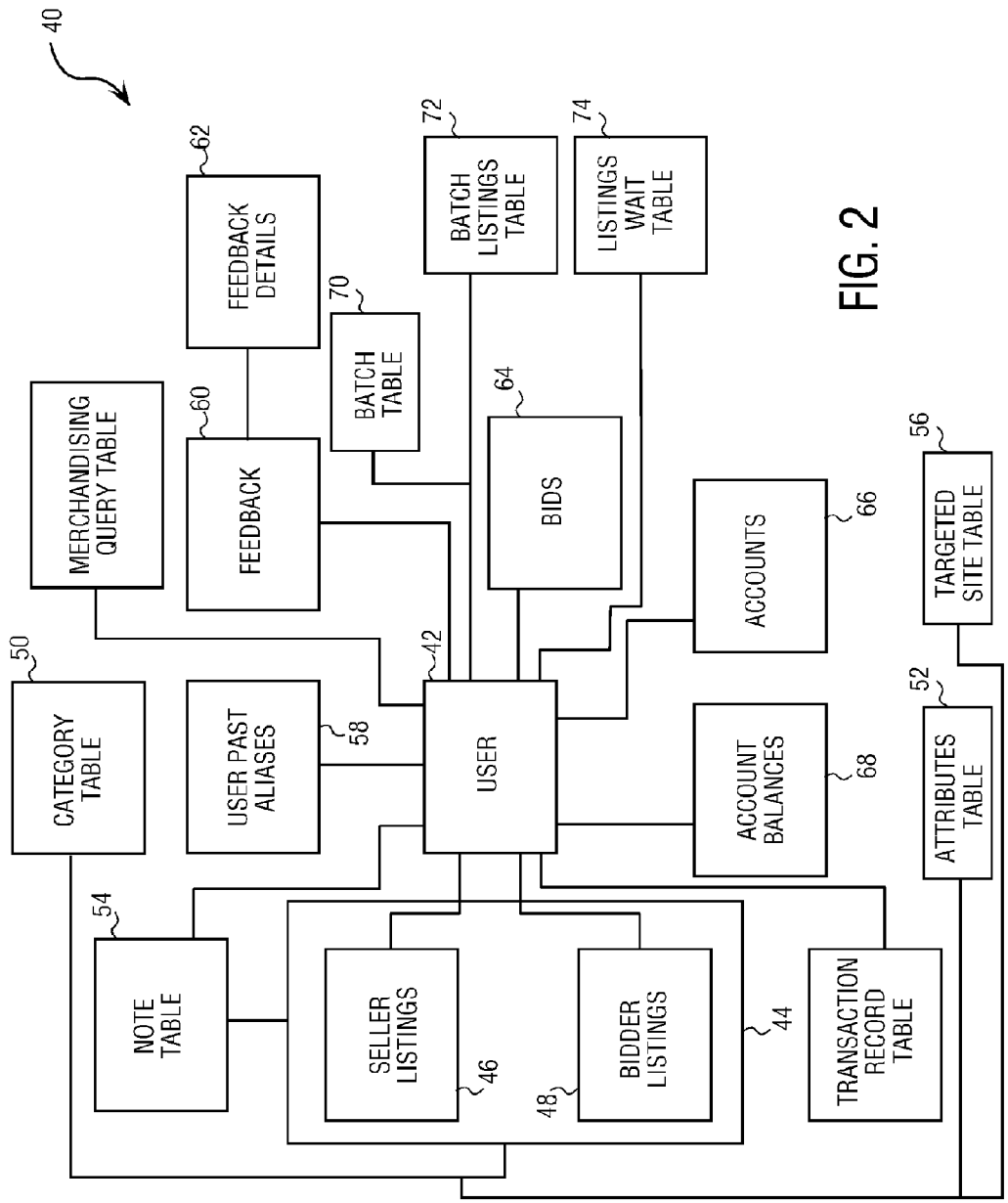
FIG. 2 is a database diagram illustrating an exemplary database, maintained by and accessed via a database engine server, which at least partially implements and supports the network-based commerce system.

FIG. 2 is a database diagram illustrating an exemplary database 40, maintained by and accessed via the database engine server 28, which at least partially implements and supports the network-based commerce system 10. In one embodiment, the database engine server 28 may maintain two databases, a first database being maintained for listing (or offering) information that is not included within a virtual "store", and a second database for listing (or offering) information that is presented via a virtual "store" supported by the network-based commerce system 10.

The database 40 may, in one embodiment, be implemented as a relational database, and includes a number of tables having entries, or records, that are linked by indices and keys. In an alternative embodiment, the database 40 may be implemented as collection of objects in an object-oriented database.

Figures 3A, 3B:
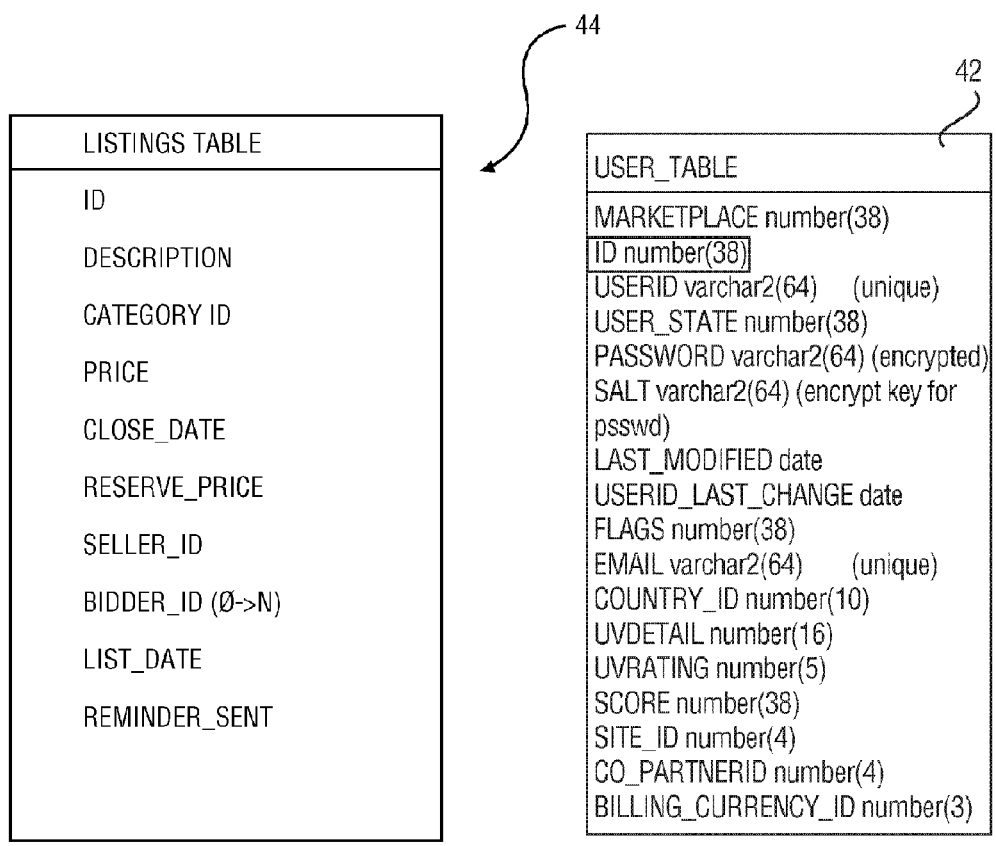
FIGS. 3A and 3B are an exemplary listings and user tables of the database.

The database 40 (see FIG. 2) includes a user table 42 that contains a record for each user of the network-based commerce system 10. An exemplary record for each user is shown in FIG. 3B. A user may operate as a seller, a buyer, or both, when utilizing the network-based commerce system 10. The database 40 also includes listings tables 44 that may be linked to the user table 42. The listings tables 44 may include a seller listings table 46 and a bidder listings table 48. A user record in the user table 42 may be linked to multiple listings that are being, or have been, listed or offered for sale via the network-based commerce system 10. In one embodiment, a link indicates whether the user is a seller or a bidder (or buyer) with respect to listings for which records exist within the listings tables 44.

The database 40 also includes one or more divisions in the form of categories provided in category tables 50. Each record within the category table 50 may describe a respective category. In one embodiment, listings provided by the system 10 are arranged in the categories. These categories may be navigable by a user of the network-based commerce system 10 to locate listings in specific categories. Thus, categories provide a mechanism to locate listings that may be browsed. In addition or instead, an alphanumeric search mechanism may be provided by the search servers 20 to allow a user to search for specific listings using search terms or phrases. In one embodiment, the category table 50 describes multiple, hierarchical category data structures, and includes multiple category records, each of which describes the context of a particular category within the multiple hierarchical category structures. For example, the category table 50 may describe a number of real, or actual, categories to which listing records, within the listings tables 44, may be linked.

The database 40 also includes one or more attributes tables 52. Each record within the attributes table 52 describes a respective attribute associated with a listing. In one embodiment, the attributes table 52 describes multiple, hierarchical attribute data structures, and includes multiple attribute records, each of which describes the context of a particular attribute within the multiple hierarchical attribute structures. For example, the attributes table 52 may describe a number of real, or actual, attributes to which listing records, within the listings tables 44, may be linked. Also, the attributes table 52 may describe a number of real, or actual, attributes to which categories, within the category table 50, may be linked.

The database 40 may also include a note table 54 populated with note records that may be linked to one or more listing records within the listings tables 44 and/or to one or more user records within the user table 42. Each note record within the note table 54 may include, inter alia, a comment, description, history or other information pertaining to a listing being offered via the network-based commerce system 10, to a user of the network-based commerce system 10. The database 40 may also include a targeted site table 56 populated with targeted site records that may be linked to one or more listing records within the listings tables 44 and/or to one or more user records within the user table 42.

A number of other exemplary tables may also be linked to the user table 42, namely a user past aliases table 58, a feedback table 60, a feedback details table 62, a bids table 64, an accounts table 66, and an account balances table 68. In one embodiment, the database 40 also includes a batch table 70, a batch listings table 72, and a listings wait table 74.

In one embodiment, the system 10 generates listing recommendations to a user of the system 10. The listing recommendations may be based on past user interaction of the particular user with the system 10, and popular search terms used in the network-based commerce system 10 (or any other systems associated with the network-based commerce system 10).

Figure 4:
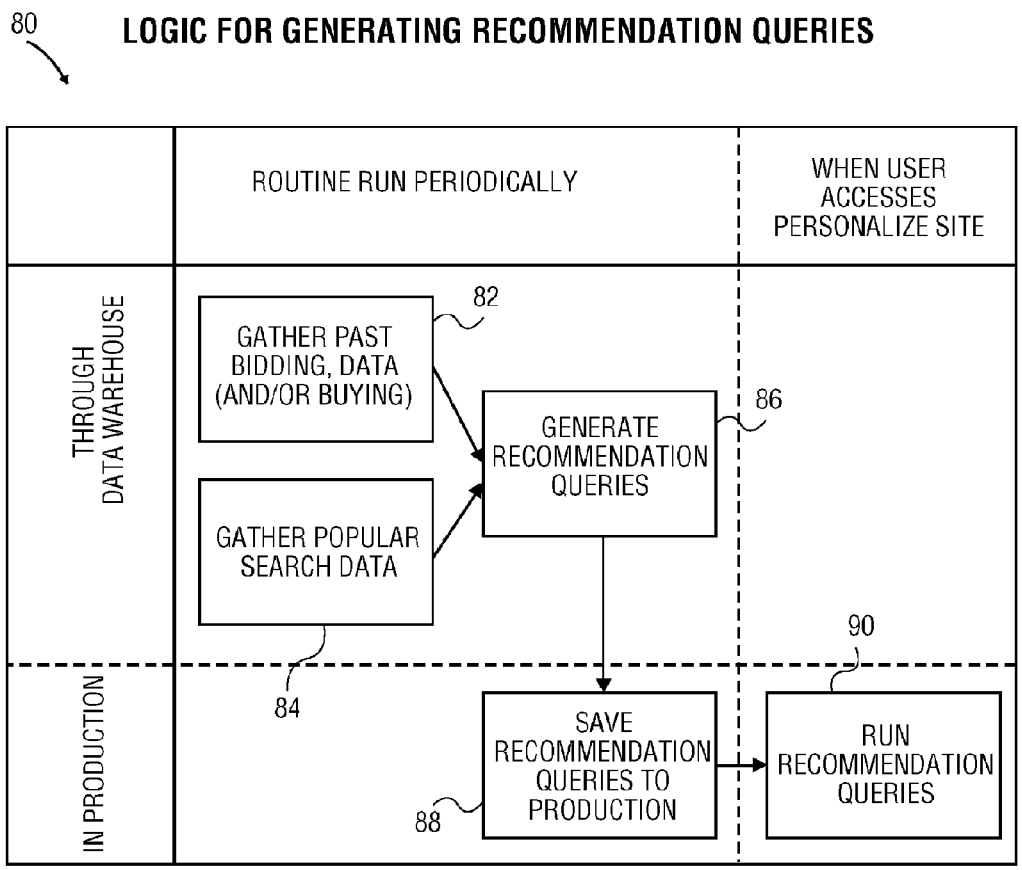
FIG. 4 is exemplary logic, in accordance with the invention, for generating recommendation queries.

Referring in particular to FIG. 4, reference numeral 80 generally indicates exemplary logic for generating recommendation queries based on past user interaction in the form of past bidding (and/or buying) history of the user, and the popular search terms. As shown at block 82 past bidding (and/or buying) data of participating users is gathered at a data warehouse. In addition, popular search terms or phrases are gathered at block 84 that, together with the past bidding (and/or buying) data is used to generate recommendation queries (see block 86). Thus, the data warehouse may identify and store search terms that are used most frequently (popular search terms) across one or more predetermined number of sites (e.g., web sites) associated with the network-based commerce system 10, and also identify data uniquely associated with each user. As shown at block 88, the popular search terms may then be passed periodically (e.g., on a daily basis) to a production facility, where the production facility may then project the popular search data against current listing inventory (see block 90). In one embodiment, a search is conducted through each category, at each category level, using each popular search term. All popular search terms that match at least a predetermined number of listings (e.g., 50 listings), located in each particular category, may be stored along with total number of listings located in the particular category using the popular search term. Thus, each category may have a number of popular search terms or phrases (e.g., from 0 to a predetermined number) assigned to it along with a measurement of the popularity of the search term in that category. Thus, the system 10 allows a search to be conducted through current listings based on popular searches (based on interaction of all users) and unique historical interaction of an individual user.

Figure 5:
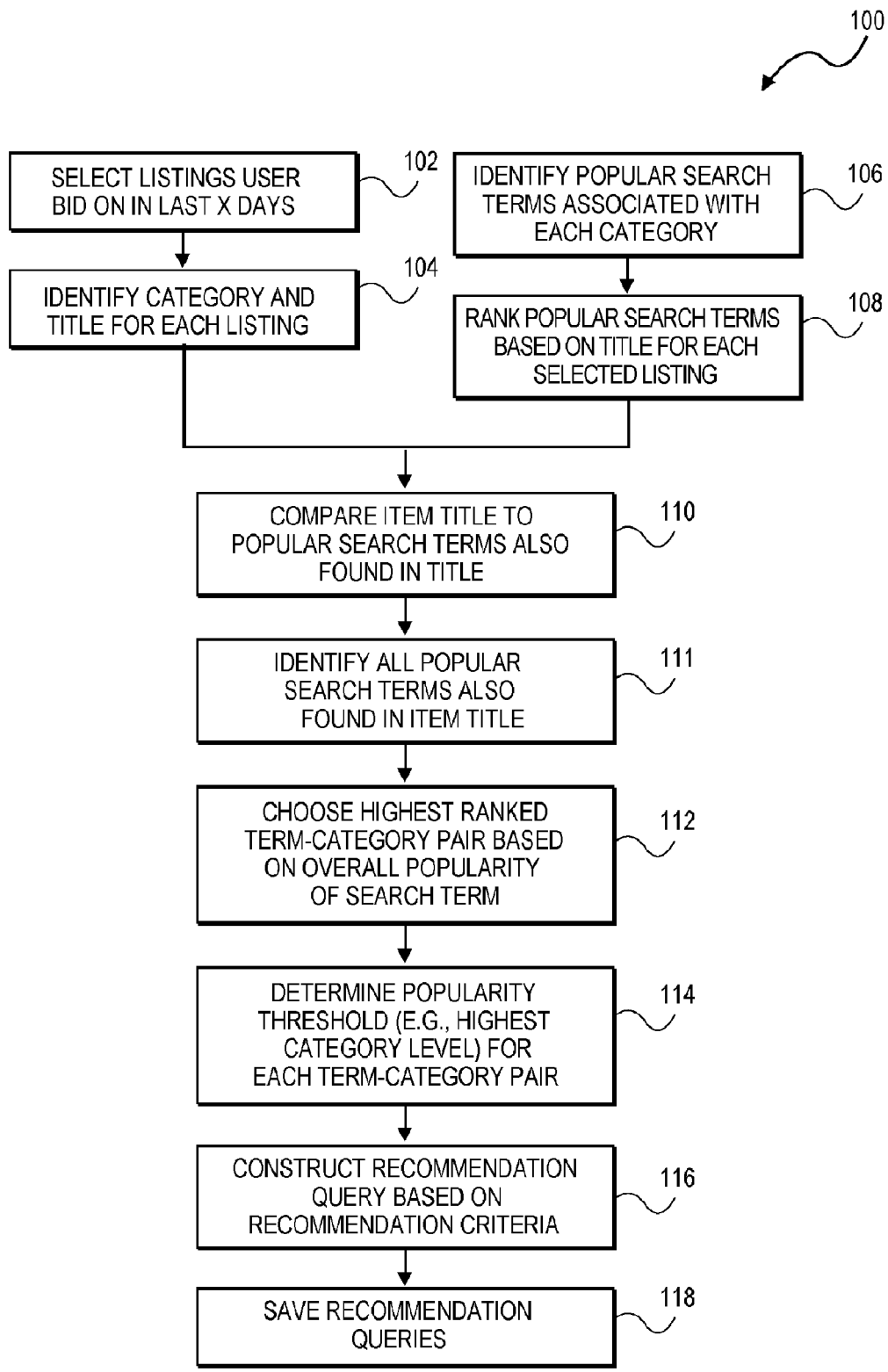
FIG. 5 is an exemplary schematic flow diagram of a method, in accordance with the invention, for generating recommendation queries.

Referring to FIG. 5, reference numeral 100 generally indicated an exemplary method, in accordance with the invention, for generating recommendation queries based on past user interaction in the form of past bidding (and/or buying) history of the user, and popular search terms. The method may be carried out at the production facility and broadly include the following operations:

1. Select user for which recommendation queries will be generated;
2. Identify at least one listing that has been interacted with by the user during a time period;
3. Determine a corresponding category associated with each identified listing and a title of each listing;
4. Find popular search terms associated with each corresponding category;
5. Rank each popular search term found;
6. Determine best term-category pairs;
7. Determine a relative popularity boundary for each term-category pair; and
8. Construct the actual recommendation queries;

The above exemplary operations are described in more detail with reference to FIG. 5. As shown at block 102, the method 100 selects prior listings (which may or may not have terminated) that the user has bid on, for example, listings (e.g., products such as goods and/or services) that the user has bid on in the last predetermined number of days or hours (e.g., the last 24 hours). Thereafter, the method 100 identifies a corresponding category associated with each prior listing and identifies the title of each listing (see block 104).

As shown at block 106, the method 100 also identifies popular search terms (terms frequently used by users) associated with each corresponding category (or sub-category). This operation may produce one or more popular search terms or phrases that are indirectly derived from listings the user has previously interacted with.

As multiple popular search terms may be associated with each category, the method 100 at block 108 ranks the popular search terms based on the title for each selected listing, as will be described in more detail below.

Once the popular search terms have been ranked (see block 108) and the category and title for each listing have been identified (see block 104), the method 100 compares the item title to popular search terms also found in the title (see block 110). Thereafter, the method 100 may identify all popular search terms also found in the title (see block 111). At this point in the method 100, a term-category pair may thus be provided for each category (which was derived from the listings that the user previously interacted with).

At block 112, the method may choose the highest ranked term-category pair based on overall popularity of the search term. Thereafter, a popularity threshold (e.g., the highest category level) for each term-category pair is determined (see block 114). A recommendation query is constructed at block 116 based on recommendation criteria. The recommendation query is then saved at block 118 for communication to a production facility.

In summary, the method 100 may be used to construct a recommendation query (e.g., a search string) that when run, for example against the database 40, may locate listings based on previous unique user interaction with the system 10 as well as popular search terms used by other users at large. It will be appreciated that the functionality described in the various blocks 102 to 118 need not be performed as separate operations and the functionality in some of the blocks may be combined into a single operation.

The method 100 for generating recommendation queries may be run periodically. In order to take into account recent changes in the user's bidding (and/or purchasing) behaviour it may be advantageous to run the recommendation queries as frequently as possible.

Figure 6:
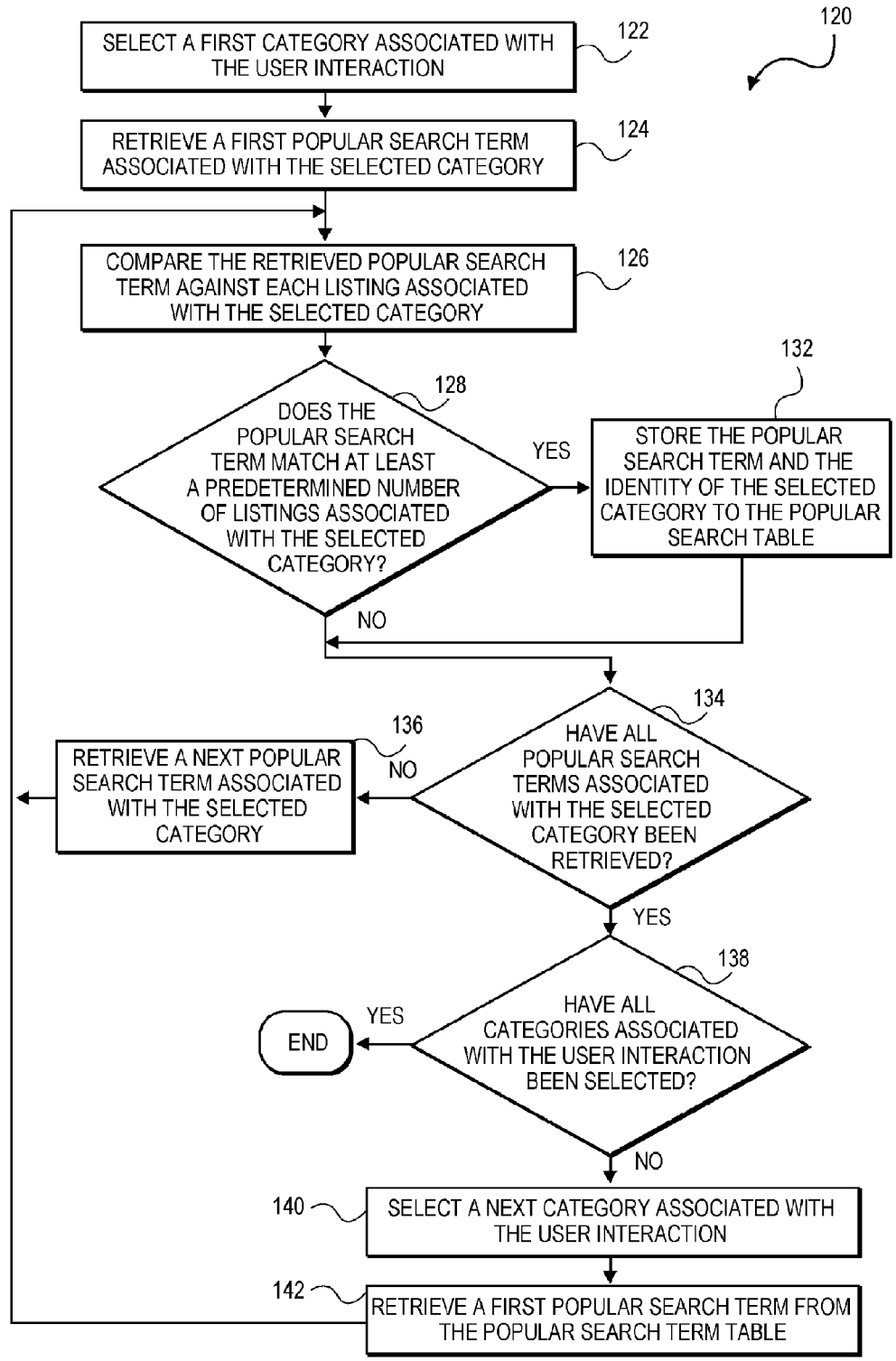
FIG. 6 is an exemplary schematic flow diagram of a method, in accordance with the invention, of determining popular search terms for selected categories of listings of the network-based commerce system.

Referring in particular to FIG. 6, reference numeral 120 generally indicates a method, in accordance with the invention, of determining popular search terms for selected categories of listings of the network-based commerce system 10. The method 120 may, for example, be used in the operation described in block 106 of FIG. 5. The generation of the popular search terms is more fully described in co-pending U.S. Provisional Patent Application 60/482,605 entitled "PRODUCT RECOMMENDATION IN A NETWORK-BASED COMMERCE SYSTEM FILED ON Jun. 25, 2003. The content of the co-pending application is incorporated herein by reference.

Figure 14A:

At block 122, a first category associated with the network-based commerce system 10 is selected. As mentioned above, this category may be a category corresponding to listings previously bid on by the user (see blocks 102 and 104 of FIG. 5). Thereafter, a library or store of popular search terms is accessed to retrieve a first popular search term associated with the selected (first) category (see block 124). The first popular search term is then compared against each listing in the first category to identify the number of listings in the selected (first) category located (see block 126). A check is then done at decision block 128 to determine if the selected (first) popular search term matches or locates at least a predetermined number of listings in the selected (first) category. If the predetermined number of listings is located, then the selected (first) popular search term and the identity of the selected (first) category are stored to a popular search table 130 (see block 132 and FIG. 14A). The method 120 then proceeds to decision block 134. If, however, the predetermined number of listings is not located, then the method 120 proceeds directly from decision block 128 to decision block 134 without storing the selected (first) popular search term.

At block 134, a decision is made as to whether or not all popular search terms associated with the selected (first) category have been retrieved. If not, then at block 136, the next (second) popular search term associated with the selected (first) category is retrieved. The method 120 then returns to block 126 and executes the functionality described above until all popular search terms associated with the selected (first) category have been retrieved and considered. Accordingly, as shown at decision block 134, when all the popular search terms associated with the selected (first) category have been retrieved, the method 120 proceeds to decision block 138 to perform the abovementioned functionality on the next selected (second) category. If all categories have not yet been considered, the method 120 proceeds to block 140 where the next category associated with the user interaction is selected and the selected (first) popular search term is retrieved from the popular search term table 130 (see block 142). The method 120 then proceeds to block 126 to execute the functionality described above on the selected (second) category. As shown at block 138, the above functionality is carried out until all categories derived from the user interaction have been considered, whereupon the method 120 terminates.

Figure 7:
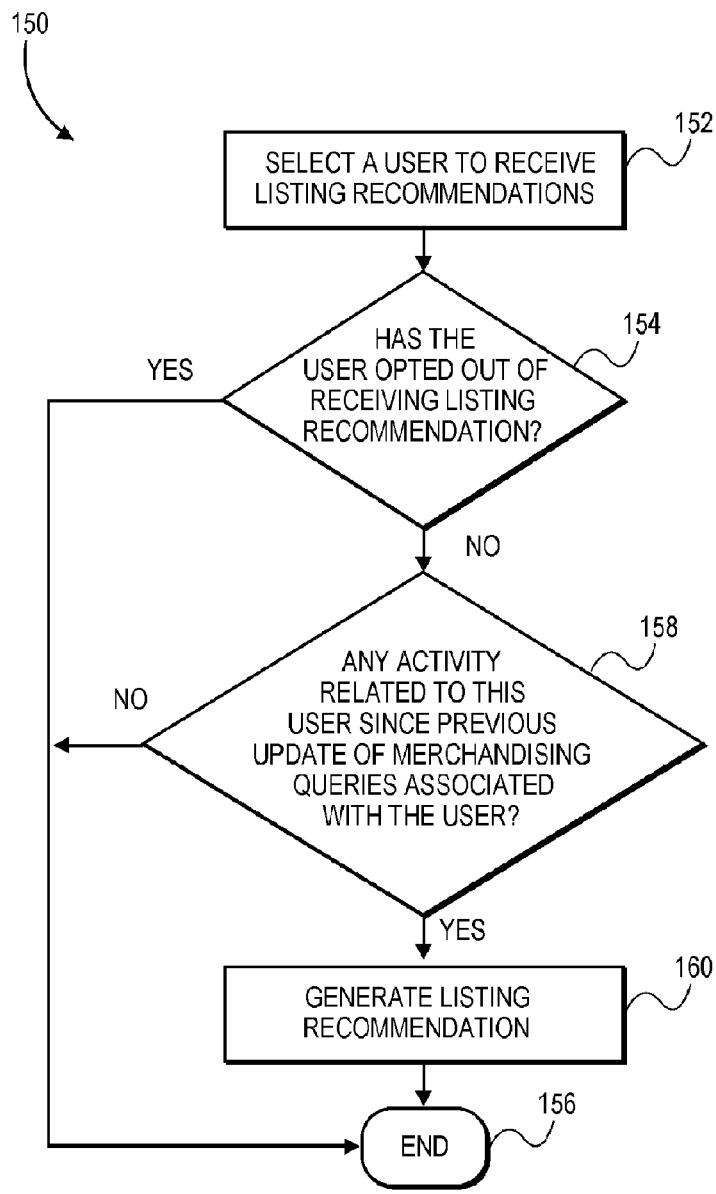
FIG. 7 is an exemplary flow diagram of a method, in accordance with the invention, of identifying matching possible phrase- or term-category pairs associated with unique listings bid on (and/or viewed and/or bought) by a user of the network-based commerce system.

Referring in particular to FIG. 7, reference numeral 150 generally indicates a method, in accordance with the invention, of identifying and ranking phrase- or term-category pairs associated with unique listings bid on (and/or viewed and/or bought) by a user of the network-based commerce system 10. The method 150 may be carried out in blocks 102, 104, and 108 in FIG. 5.

As shown at block 152, a user may be selected to receive a recommendation query that, when run, generates listing recommendations tailored to the specific user. However, it is to be appreciated that any one or more users of the network-based commerce system may receive listing recommendations. According, as shown at decision block 154, an enquiry is made whether or not a user has opted out of receiving listing recommendations and, if so, the method 150 then terminates at block 156. However, if the user has opted in, the method 150 proceeds to decision block 158 to determine if any activity (e.g., interaction with listings of the network-based commerce system 10) related to the user has taken place since the method 150 was previously executed for the user. If no activity (e.g., purchasing of listings, bidding on listings, viewing of listings, etc.) has occurred since the user's recommendation queries were previously updated, then the method 150 terminates at block 156.

Thus, in one embodiment, recommendation queries may be recalculated for each user when necessary (e.g., the user is active bidder/purchaser). For example, if the process of generating new recommendation queries fails, or cannot be completed for some reason, the queries previously generated may become stale or inappropriate. However, even if stale, recommendation queries may continue to be used to generate recommended listings when run against current listings. Thus, even though the recommendation query itself is stale, when the current listings (to which new listings may be constantly added and terminated listings may be removed) are searched using the stale recommendation query, different recommended listings may be provided to the user. Thus, it is important to note that although the recommendation query or queries may not have been updated, they may still be run as often as the network-based commerce system 10 determines necessary. Each time the queries are run, new results may be yielded. Such new results reflect the unpredictability of inventory supply and demand in the network-based commerce system 10. In one embodiment, a subsequent attempt to generate a recommendation query for a user, where a previous attempt has failed, should take the time period considered in the pervious attempt into account. For example, assuming the process checks whether a user has placed a new bid in the last 24 hours. If the recommendation process fails, then the next time the recommendation process is run, it should check for bids within the last 48 hours.

Returning to block 158, if user activity during a selected time window has taken place, then at block 160 the method 150 may then generate listing recommendations unique to the user. In one embodiment, the method 100 (see FIG. 5) is executed in block 160.

Figure 14B:

In one embodiment, where listings are arranged in hierarchical structure having parent and child categories, unique listings (e.g., listings during a predetermined period, e.g., 30 days) that the user has interacted with are retrieved from a Bid Listing and Parent Category table 162 (see block 102 in FIG. 5 and FIG. 14B). When the listings are items, the Bid Listing Category table 162 may include a User_ID field, an Item_Bid_On_ID field, an Item_Bid_On_Title field, and an Item_Bid_On_Parent_Category field.

Further, for each of the identified unique listings, a primary parent level category (e.g., a highest level category in the hierarchical category structure) may be identified (see also block 104 in FIG. 5). Based on the primary parent level category, popular search terms may be identified (see also block 106 in FIG. 5) that are associated with the primary parent level category. In one embodiment, all of the identified popular search terms associated with each of the identified unique listings are compared against all listings in the primary parent level category to determine if any of the popular search terms match any portion of a title of a corresponding listing in the primary parent level category.

Figure 14C:

In one embodiment, popular search terms are ranked (see block 108 in FIG. 5) according to their popularity (number of corresponding listings) per parent level category. For a specific listing's parent level category, each of the popular search terms identified are run against all the listings in the category and a count associated with each popular search term is incremented each time the popular search term matches any portion of a title of a listing. A temporary list of the popular search terms and their associated count (indicating the number of times the popular search term matched a portion of a listing title) may be maintained in a descending order of popularity. For each of the identified listings and their associated parent level category, the most popular of the matching popular search terms (e.g., first popular search term in the list) is selected and stored in a Matching Popular Search Term table 164 (see FIG. 14C). When the listings are items, the Matching Popular Search Term table 164 may include a User_ID field, an Item_Bid_On_ID field, an Item_Bid_On_Title field, an Item_Bid_On_Parent_Category field, and a Popular_Search_Term_Match field.

In one embodiment, all unique listings up to a predetermined number (e.g., 20) that the user has interacted with in the predetermined or selected time period (e.g., 30 days) may be chosen. In one embodiment, the following two types of listings are be ignored when generating recommendation queries:

Listings listed in banned categories based on a user's site of registration; and Listings listed for mature audiences.

In one embodiment, there may be multiple country sites (e.g., US., U.K., DE, etc.) associated with the network-based commerce system 10. For purposes of generating recommendation queries, listings to be recommended may be chosen from any of the country sites associated with the network-based commerce system 10. Accordingly, in one embodiment, no listing is ignored because it was listed on a different country site than that which the user is registered on. Of course, in an alternative embodiment the user may specify that listings only be recommended from a selected site or sites.

Popular search terms that have been ranked may be stored in a Ranked Matching Term table 166 (see FIG. 14D). The Ranked Matching Term table 166 may include a User_ID field, an Item_Bid_On_ID field, an Item_Bid_On_Parent_Category field, a Popular_Search_Term field, and a Popular_Search_Term_Ranking field.

As mentioned above, a list of the highest ranked popular search terms in the parent level category may be used to generate listing recommendations. In one embodiment, a configurable value may determine a "popularity threshold". This value may be a lowest rank within a given category that a popular search term must have to be considered "popular enough" for the purposes of creating recommendation queries in the network-based commerce system 10. For example, there may be 40 terms or phrases that are considered in a category, but the popularity threshold may be set to 25 so that only the top 25 search terms within that category are used. The popular search terms may be retrieved from a Popular Search Term table 130 (see FIG. 14A). Recommendation queries for each user may stored in a Recommendation Query table 168 (see FIG. 14E) that includes a User_ID field, an Item_Bid_On_Category field, a Popular_Search_Term field, and a Relative_Upper_Boundry field. When the recommendation query is run against current inventory, recommended listings for the particular user may be uniquely generated and stored, for example, in a Recommendation table 170 (see FIG. 14F).

Figure 8:
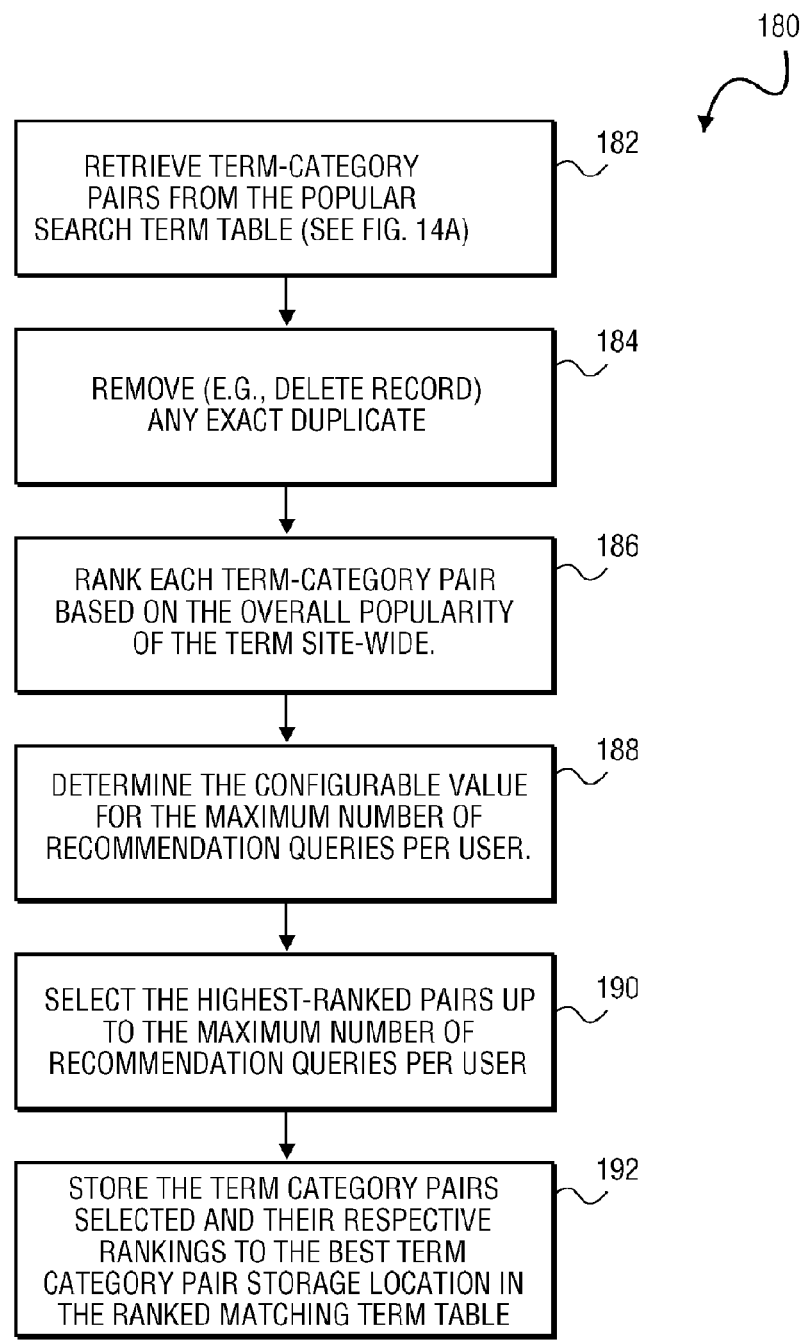
FIG. 8 is an exemplary flow diagram of a method, in accordance with the invention, of ranking term-category pairs.

As mentioned above (see block 110 in FIG. 5), the method 100 may select the most popular search term associated with each category thereby selecting term-category pairs. An exemplary method 180, also in accordance with the invention, to choose the best term-category pairs is shown in FIG. 8. At block 182, term-category pairs are retrieved from the Matching Popular Search Term table 164. The term-category pairs retrieved may only be those for the specific user that a recommendation query or queries is being generated for. In one embodiment, the term-category pairs retrieved may be required to meet one or more of the following exemplary criteria:

The term-category pairs are relevant in the categories associated with a listing that the user was bidding on;

The term-category pairs match actual titles of listings the user has bid on; and/or The term-category pairs represent the unique and/or interesting qualities of those listings.

In order to avoid duplication, at block 184, duplicates of any of the term-category pairs are removed (e.g., the record may be deleted). For example, a user may have bid on two Norelco razors, each generating a term-category pair for "Norelco" in "Electric Shavers." This duplication may then be removed at block 184.

Once any duplicates have been removed, at block 186 each term-category pair is ranked based on the overall popularity of the relevant search term across the entire network-based commerce system 10 (and any associated sites which may be included). The most popular search term may then be given a rank of 1, the next most popular may be given a rank of 2, and so on until all popular search terms have been ranked. Thereafter, at block 188, a configurable value relative to the maximum number of recommendation queries per user is determined. The configurable value may be used to determine the cut-off point or popularity threshold of the popular search terms or term-category pairs. In one embodiment, if the user has fewer term-category pairs than the maximum number of recommendation queries allowed per user, then all of the term-category pairs in the Popular Search Term table 130 may be used.

At block 190, the highest ranked term-category pairs up to the maximum number of recommendation queries per user are selected. Thereafter, at block 192, the term-category pairs selected at block 190, and each of their respective rankings, are stored in the Ranked Matching Term table 166. Each of the term-category pairs stored in the Ranked Matching Term table 166 may then be used to produce a recommendation query as described herein.

Reference numeral 200 (see FIG. 10) generally indicates a method, in accordance with the invention, for determining a popularity threshold or upper boundary of a term-category pair. The method 200 is described with reference to an exemplary category node tree 202 (see FIG. 9), also in accordance with the invention. The method 200 may be used in deciding the popularity threshold as described in block 114 of FIG. 5. As the recommendation queries are based on user interaction with the system 10, they are related to the buyer's interests.

Figure 9:
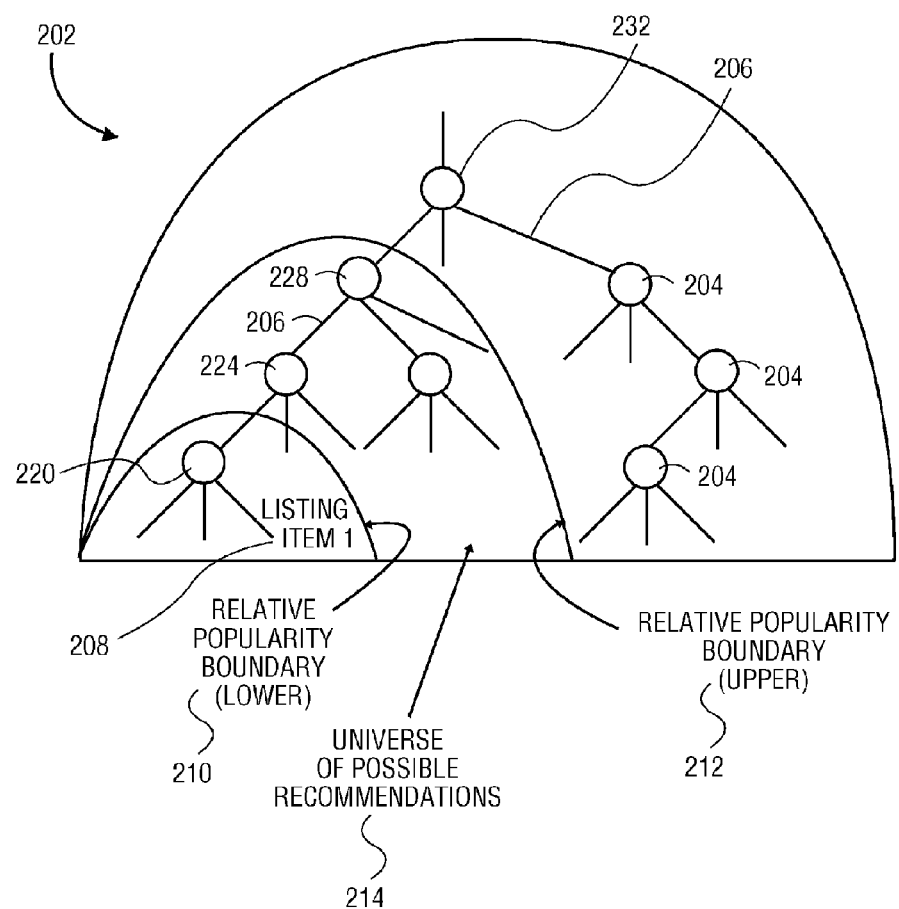
FIG. 9 is a schematic illustration of an exemplary category node tree, in accordance with the invention, for determining a popularity threshold of a term-category pair.
Figure 10:
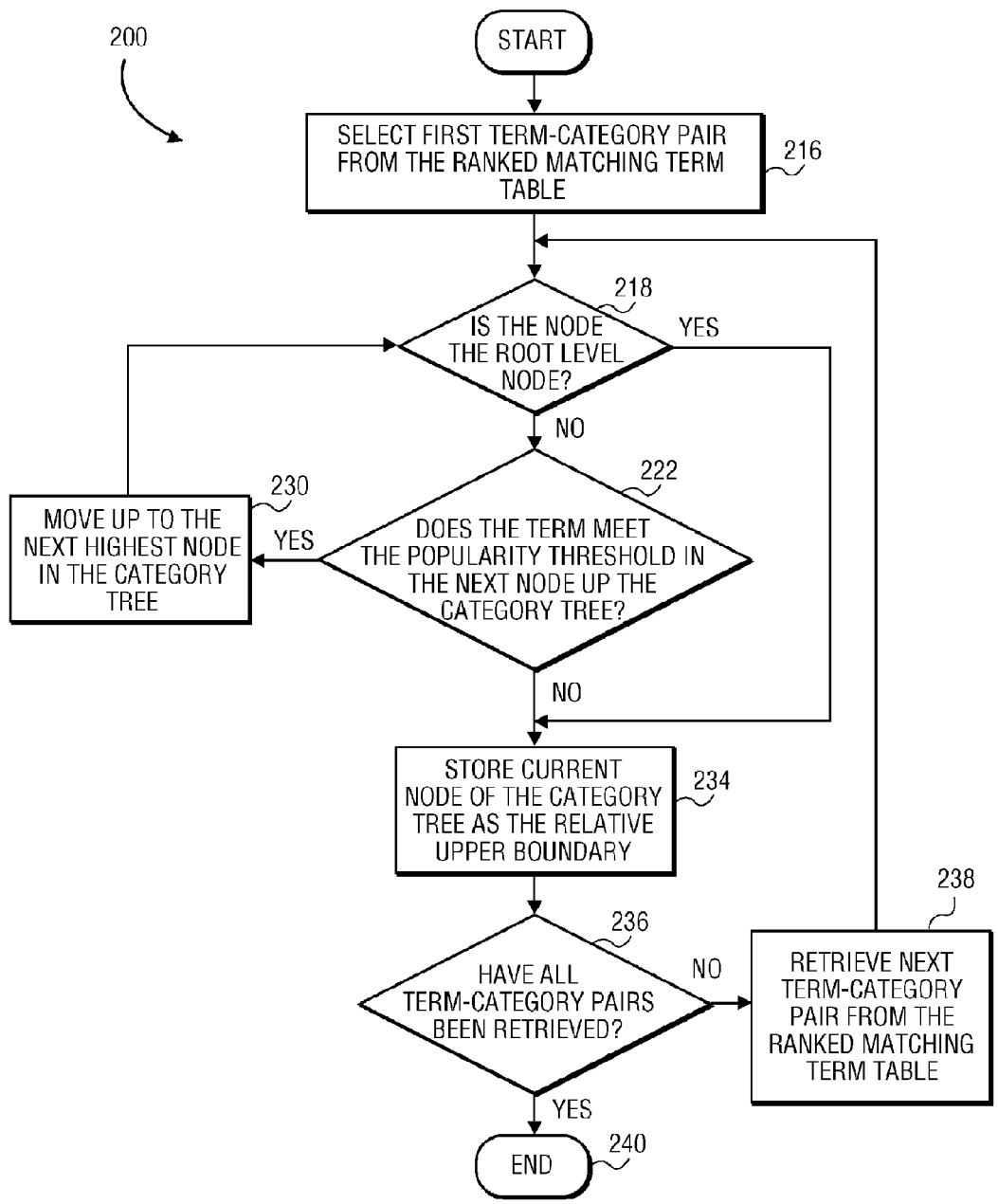
FIG. 10 is an exemplary flow diagram of a method, in accordance with the invention, of determining a relative upper popularity boundary of a listing associated with a term-category pair.

Referring in particular to FIG. 9, the category node tree 202 shows an exemplary data structure in which each node may be attached to one or more nodes directly beneath it. Branches 206 may interconnect the nodes. An example of a listing 208 and a relative lower popularity boundary 210 of an associated term-category pair and a relative upper popularity boundary 212 of the term-category pair are shown. The space between the relative lower popularity boundary 210 and the relative upper popularity boundary 212 may be referred to as a "universe of possible recommendations" 214. The universe of possible recommendations 214 may also be referred to as a relative footprint of possible recommendations.

Returning to method 200 (see FIG. 10) of determining the relative upper boundary of the term-category pair. Previously, as described above, the method 180 (see FIG. 8) ranked and stored term-category pairs associated with a unique listing with which the user has interacted (see FIG. 14D). The Item_Bid_On_Parent_Category field may indicate the parent category of the unique listing and, in certain embodiments, may define the unique listing's relative lower popularity boundary 210 (see FIG. 9). The method 200 may then be utilized to determine the relative upper popularity boundary 212 (see FIG. 9).

In order to determine the relative upper popularity boundary 212, at block 216 the first term-category pair associated with a specific user is selected from the Ranked Matching Term table 166 (see FIG. 14D). Thereafter, at decision block 218, a determination is made as to whether or not a node is a root level node (the node at a highest level in category node tree 202). If the node is not a root level node, at decision block 222 a determination is made as to whether or not the term-category pair meets the popularity threshold in the next higher level node 224 of the category node tree 202. If the term-category pair meets the popularity threshold at the next node 224, then the next higher level node 228 in the node tree 202 is selected at block 230 and the method 200 returns to decision block 218. In the present example, the term-category pair is shown to meet the popularity threshold at the node 228 and, accordingly, the method 200 also considers the next higher level node 232. If, however, the term-category pair does not meet the popularity threshold at the next node (in the present example node 232) then at block 234, the current node (node 228 in the present example) is selected and stored as the relative upper boundary in the exemplary Recommendation Query table 168 (see FIG. 14E). As shown at decision block 236, if all term-category pairs have not been processed, then the method 200 at block retrieves the next phrase-category pair and proceeds to decision block 218. Once all term-category pairs have been processed, the method 200 terminates at block 240.

Thus, according to method 200, if the term-category pair meets the popularity threshold in the current category, the next highest node in the category node tree is selected. The process of sequentially moving up the category tree (see block 230) continues until the term-category pair no longer meets the popularity threshold or a root level node has been reached. As described above, when the root level node (e.g., the node 232) is reached or the term-category pair does not meet the popularity threshold in the next node up the node tree 202, then the current node is stored as the relative upper popularity boundary to the Recommendation Query table 168.

Figure 11A:
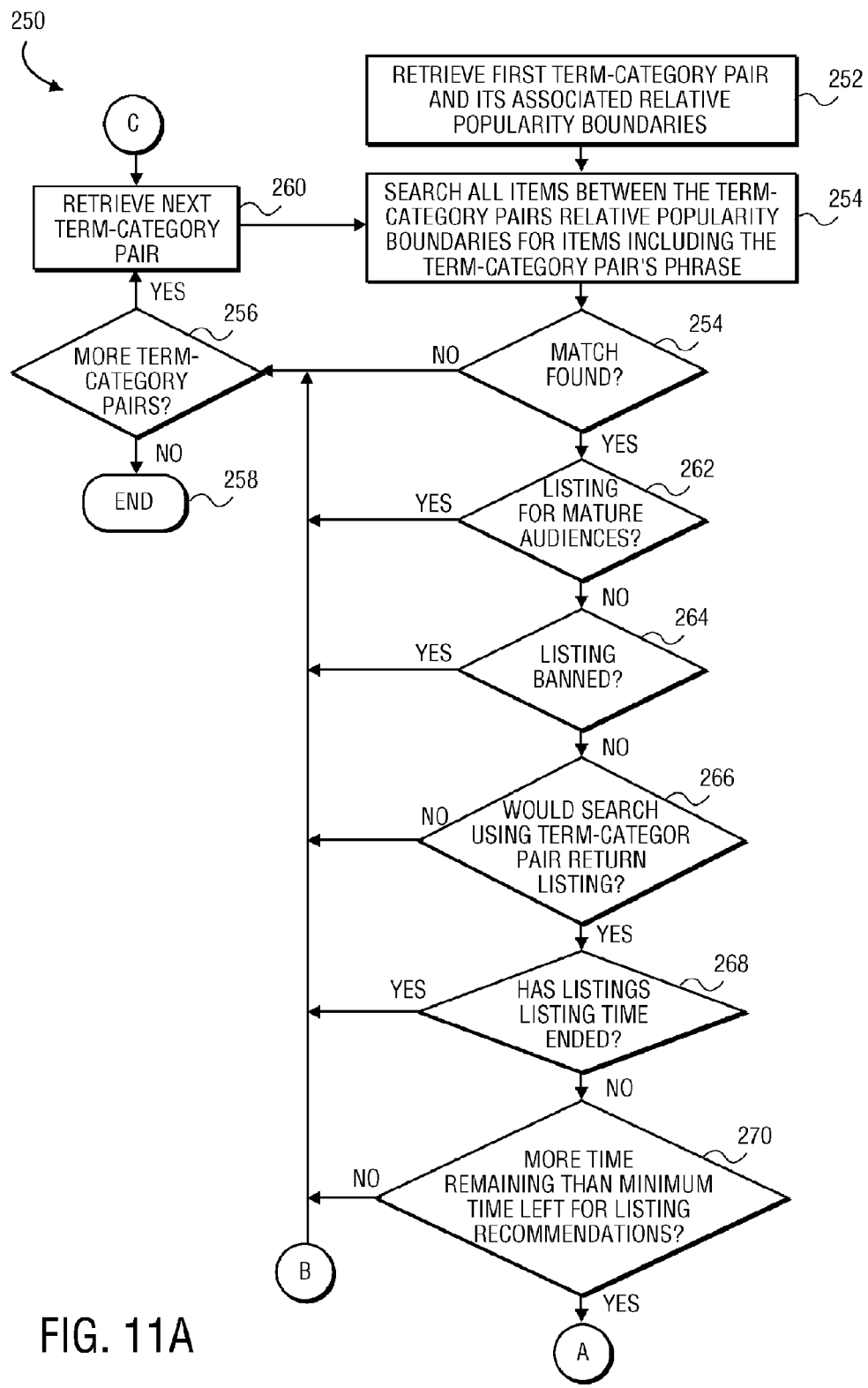
FIGS. 11A and 11B show an exemplary flow diagram of a method, in accordance with the invention, of running a recommendation query.
Figure 11B:
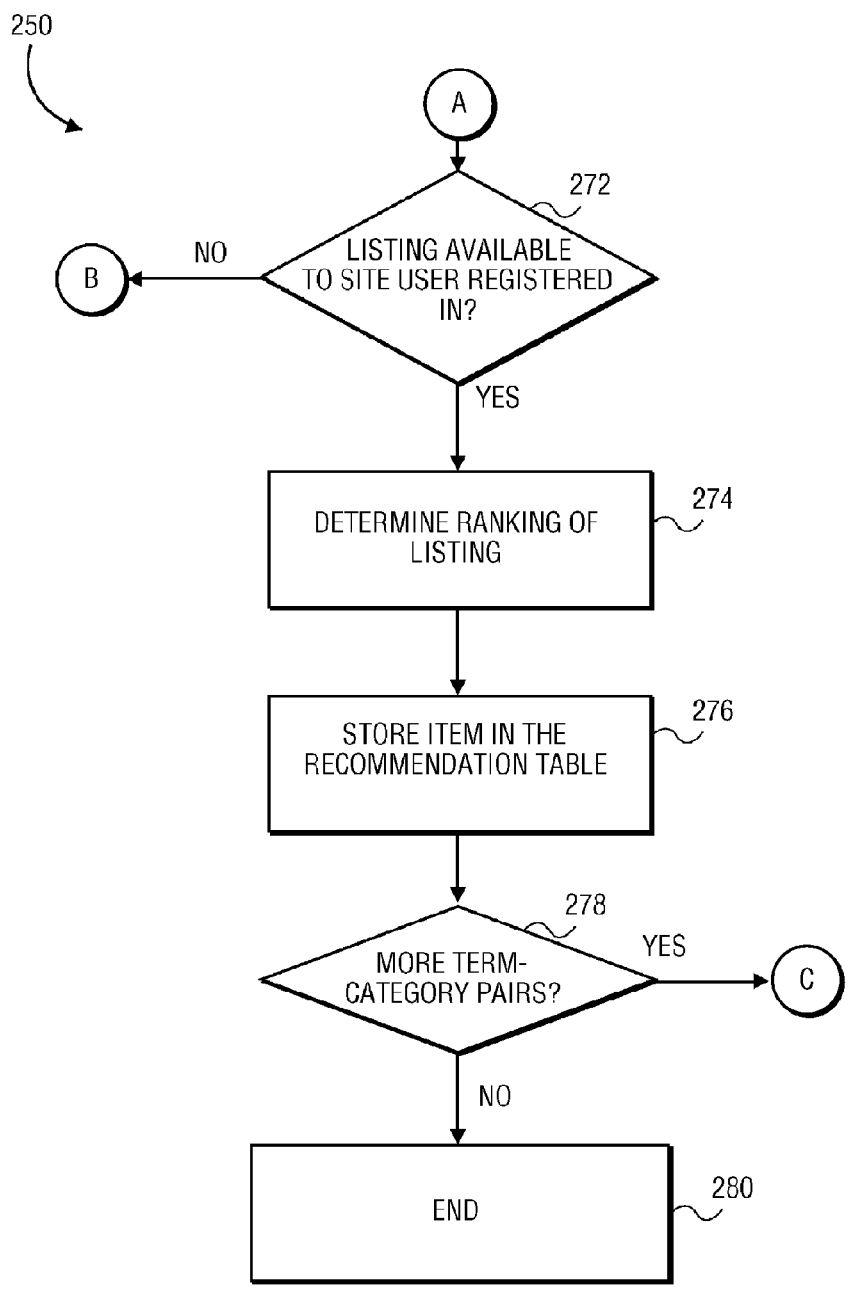

Referring in particular to FIGS. 11A and 11B, reference numeral generally indicates a method, in accordance with the invention, of running a recommendation query to generate recommendation listings. In one embodiment, the recommendation query is a set of instructions to locate a listing from a plurality of listings, utilizing a popular search term and its relative popularity boundaries 210, 212.

At block 252, a first term-category pair and its associated relative popularity boundaries (e.g., relative upper popularity boundary 212 and relative lower popularity boundary 210) are retrieved. The upper popularity boundary 212 may be retrieved from the Recommendation Query table 168, and the lower popularity boundary 210 may be provided by the Item_Bid_On_Parent_Category field of the Ranked Matching Term table 166. Thus, in certain embodiments, the relative lower popularity boundary 210 may be derived from a listing that the user previously interacted with.

Thereafter, at block 254 all listings between the relative lower popularity boundary 210 and relative upper popularity boundary 212 of the retrieved term-category pair are searched to locate listings identified by the term-category pair (in other words a popular search term that has been identified and processed by the method 100).

At decision block 254, a determination is made as to whether a match is found and, thus, if any listings (items) have been found in the universe of possible recommendations 214 (see FIG. 9). If no match or listings are found, then at decision block 256 a determination is made to check if all term-category pairs have been searched. If all term-category pairs have been searched, then the method 250 terminates at 258. However, if more term-category pairs are to be searched, as shown at block 260 the next term-category pair is retrieved whereafter the method 250 returns to block 254 to execute the abovementioned functionality for the next term-category pair.

Returning to block 254, if a match is found, and thus a listing identified by the term-category pair has been located, then a filter process is performed to filter out or reject selected listings. For example, at decision block 262, listings for mature audiences are filtered out or rejected, at decision block 264 banned listings are rejected, at block 266 listings which would not be located using the term-category pair are rejected, at decision block 268 listings with a listing time close to ending (or already ended) may be rejected, at decision block 270 listings with more time remaining than a minimum time left are rejected, and at decision block 272 listings not available to a user of a site the user is registered in may be rejected. For example, rules of the network-based commerce system 10 my restrict user access to certain listings and/or sites. It is however, to be appreciated that the aforementioned filter criteria may be supplemented, reduced, changed in various different embodiments. In one embodiment, the minimum time left for listing recommendations is a configurable value. Thus recommendations may not be made for listings that have so little time remaining that the buyer cannot be expected to make a decision to interact (e.g., bid, purchase, make inquiries, etc.) with the listing before it ends.

The listings located using the term-category pair are ranked at block 274 and thereafter stored in the Recommendation table 170 (see FIG. 14F) as shown at block 276. As mentioned above, the functionality in the method 250 is carried out on all term-category pairs and, accordingly, at decision block 278 a determination is made to check if all term-category pairs have been processed. If all term-category pairs have not been processed, then the method 250 proceeds to block 260 (see FIG. 11A). However, if all term-category pairs have been processed, then at block 280 the method 250 ends.

Each listing is the recommendation table (see FIG. 14F) may be ranked according to a predetermined set of configurable criteria. For example, in one embodiment, listings including an image of the listing that a user may view may be ranked higher than listings without an image. If the listings are equally ranked, a configurable value may determine, for example, whether listings ending sooner or listings listed most recently will be ranked higher.

In certain embodiments, it may be desirable to generate recommended listings that are not the same (or substantially similar) to listings the user has already been interacting with (e.g., bid or bidding on, viewed, purchased, etc.). Accordingly, in one embodiment, recommendation queries may produce results outside the category (or categories) associated with the listings that the user has interacted with.

For example, a user may have purchased a listing for a CD from a "Rock" category wherein a matching popular search term for that listing is "Melissa Etheridge." Listing recommendations corresponding to or matching "Melissa Etheridge" may however be drawn from multiple categories. For example, in generating recommended listings, listings from the "Rock" category could be excluded, or all CDs could be excluded and something else entirely could be presented to the user. In the current example, using "Melissa Etheridge", since Melissa Etheridge CDs may also be commonly found in Country CDs, the entire CD category may be ignored. Ignoring the entire CD category may be accomplished by recognizing that "Melissa Etheridge" is still relatively popular even in the entire category of CDs. However, outside the CD category, the term "Melissa Etheridge" may no longer ranked as high in popularity. Therefore, the relative lower popularity boundary of "Melissa Etheridge" may be defined as the CD category. Thus, in this example, all listings falling within the CD category may be excluded in the recommendation query.

Figure 12:
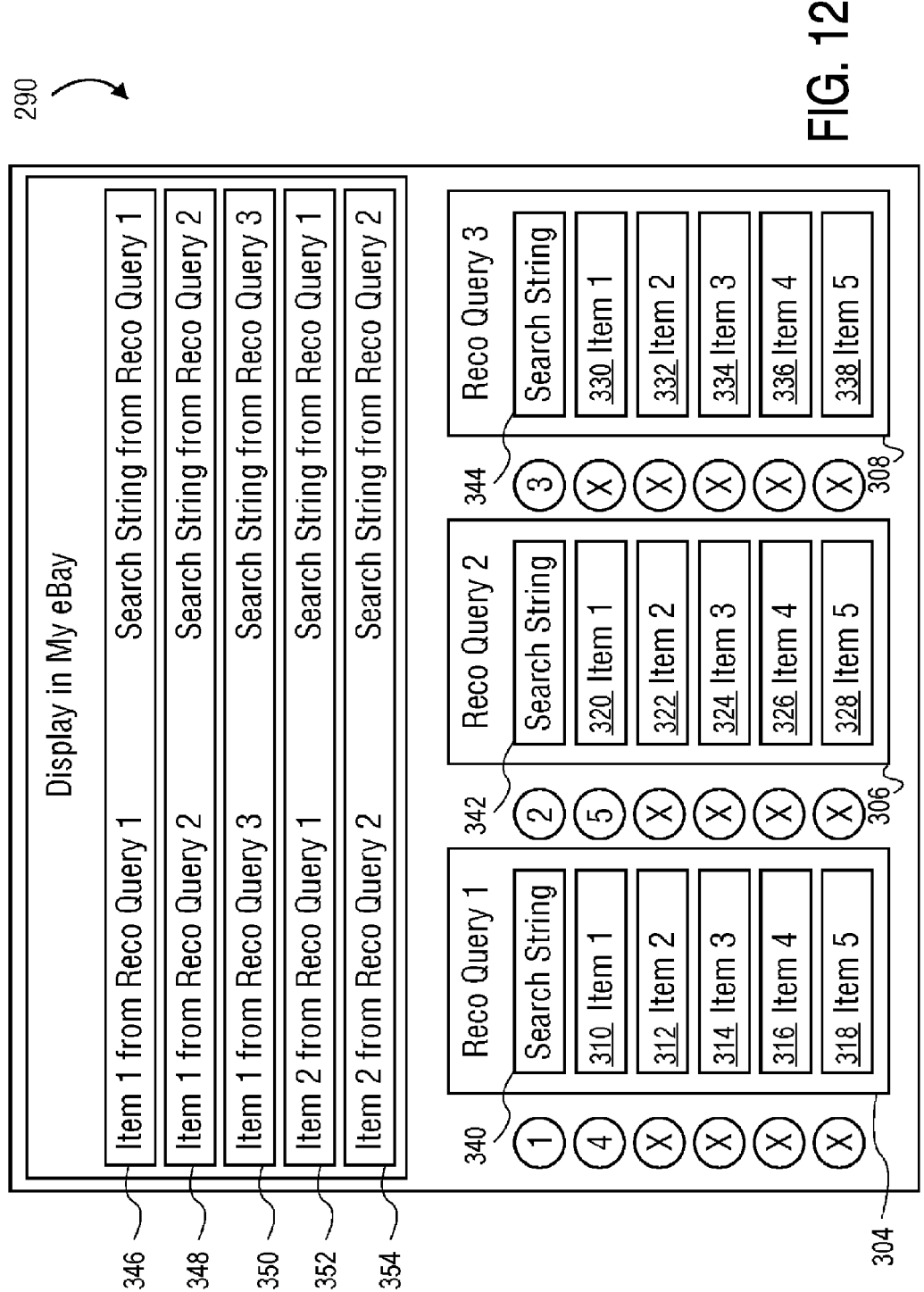
FIG. 12 is a schematic representation of an exemplary listing recommendation table of the database.

As mentioned above, each recommendation query may produce multiple recommended listings. FIG. 12 shows an exemplary listing recommendation table 290 for storing three recommendation queries and five recommended listings or items generated from each one of the three recommendation queries. The recommended listings may then be displayed via a graphic user interface 292 (see FIG. 13). The graphic user interface 292 may form part of a larger user interface and, in Internet applications of the network-based commerce system 10, the graphic user interface 292 may be a web page. The graphic user interface 292 includes five rows 294 to 302 that each displays a recommended listing to the user. The recommended listings may include hyperlinks to further details on the recommended listing.

The graphic user interface 292 may be populated from the recommendation table 290. In particular, the recommendation table 290 includes three columns for each of the recommendation queries. Accordingly, column 394 stores five recommended listings 310 to 318 associated with the first recommendation query, column 306 stores five recommended listings 320 to 328 associated with the second recommendation query, and column 308 stores five recommended listings 330 to 338 associated with the third recommendation query. The recommended listings in the columns 304 to 308 are generated by searching all current listings using search strings 340 to 344 associated with the first, second and third recommendation queries, respectively.

Rows 346 to 354 are populated by sequentially selecting items or listings from the columns 304 to 308 and their associated recommendation query data. The graphic user interface 292 may then be populated from the rows 346 to 354.

The number of recommendation queries and/or recommended listings may differ from one embodiment to the next. Each recommendation query may thus produce a finite number of recommendations, equal to the number of listing recommendations to be displayed to a user. While the recommendation query may not always reflect the most recent activity of the user, in one embodiment the network-based commerce system 10 is configured so that the actual listings returned from the recommendation query are up to date (e.g., correct price, listing's time remaining).

In certain embodiments, the graphic user interface 292 is only displayed to a user of the network-based commerce system that has opted to receive recommended listings. In one embodiment, the network-based commerce system 10 only provides recommended listings to the user when there has been sufficient past interaction by the user, with the network-based commerce system 10, to support the generation of recommendations.

In certain circumstances, the network-based commerce system 10 may not generate the listings recommendation table 290 for a particular user. For example, a user might not have a listing recommendation table 290 if:

The user has explicitly opted out;

The user has opted in but there are no saved recommendation queries currently for the particular user; and The user has opted in and there are recommendation queries for the particular user, but those queries return zero results.

As mentioned above, the exemplary graphic user interface 292 only shows a limited number of recommended listings generated by each recommendation query. In order to provide the user with more recommendation queries, the user interface 292 includes a "show me more" links 356 associated with the recommended listings provided in rows 294 to 302 (see FIG. 13). In one embodiment, clicking or activating a "show me more" link 356 will run exactly the same recommendation query that was run to generate the listing recommendation currently displayed in the particular row 294 to 302 to the user. However, all results (as opposed to only one recommended listing) generated as a result of the query initiation via the "show me more" link 356 will be returned.

Figure 15:
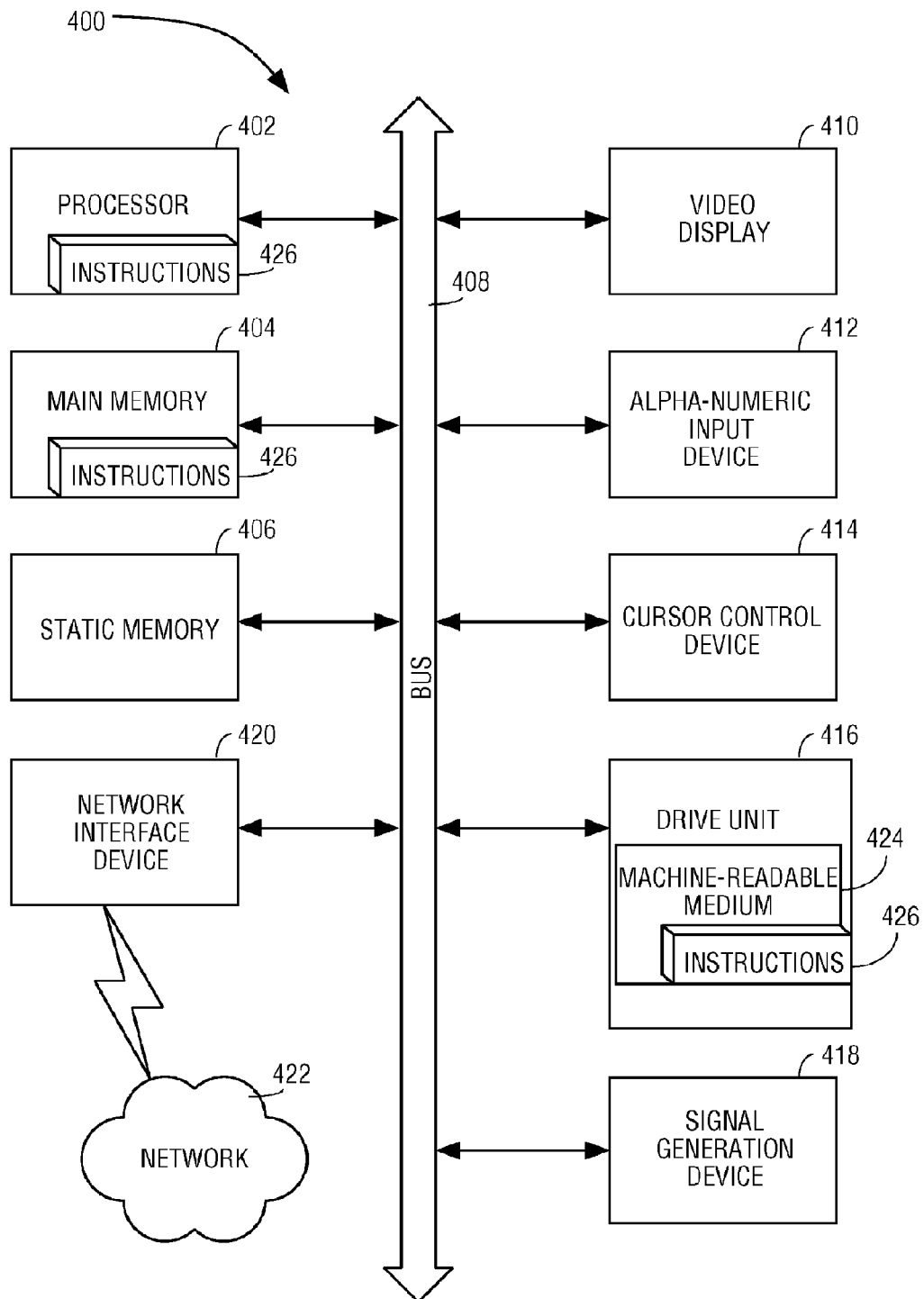
FIG. 15 shows a diagrammatic representation of machine in the exemplary form of a computer system within which a set of instructions, for causing the machine to perform any one of the methodologies discussed herein, may be executed.

FIG. 15 shows a diagrammatic representation of a machine in the exemplary form of a computer system 400 within which a set or sequence of instructions, for causing the machine to perform any one of the methodologies discussed herein, may be executed. In alternative embodiments, the machine may comprise a network router, a network switch, a network bridge, Personal Digital Assistant (PDA), a cellular telephone, a web appliance, set-top box (5TB) or any machine capable of executing a sequence of instructions that specify actions to be taken by that machine.

The computer system 400 includes a processor 402, a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420 to interface the computer system to a network 422.

The disk drive unit 416 includes a machine-readable medium 424 on which is stored a set of instructions or software 426 embodying any one, or all, of the methodologies described herein. The software 426 is also shown to reside, completely or at least partially, within the main memory 404 and/or within the processor 402. The software 426 may further be transmitted or received via the network interface device 420. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Further, while the software is shown in FIG. 15 to reside within a single device, it will be appreciated that the software 426 could be distributed across multiple machines or storage media, which may include the machine-readable medium.

Thus, a method and system to recommend listings of a network-based commerce system 10 have been described. Although the invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    selecting a user to receive one or more recommended listings hosted by a network-based commerce system;
    determining a term-category pair that pairs a term with a category of listings in which the term matches at least a predetermined number of listings and with which the selected user has interacted in an interaction;
    generating a user-specific query that corresponds to the selected user and that includes the term from the term-category pair, the generating of the user-specific query being performed by a processor of a machine;
    identifying a recommended listing from among a plurality of listings hosted by the network-based commerce system, the identifying of the recommended listing being based on the generated user-specific query and including identifying a set of listings within the plurality of listings, the set of listings being identified between an upper popularity boundary of the term-category pair and a lower popularity boundary of the term-category pair; and
    providing the recommended listing to a client machine of the selected user.

2. The method of claim 1, wherein:
    the interaction includes a purchase by the user of an item that corresponds to a further listing within the plurality of listings; and
    the selecting of the user is based on at least one of the purchase or the further listing.

3. The method of claim 1, wherein:
    the interaction includes a bid by the user on an item that corresponds to a further listing within the plurality of listings, the bid being indicative of an attempted purchase of the item by the user; and
    the selecting of the user is based on at least one of the bid or the further listing.

4. The method of claim 1, wherein:
    the interaction includes a presentation to the user of a further listing within the plurality of listings in response to a request to view the further listing; and
    the selecting of the user is based on at least one of the request, or the further listing.

5. The method of claim 1, wherein:
    the selecting of the user includes determining that the user has not opted out of receiving recommended listings from the network-based commerce system.

6. The method of claim 1, wherein:
    the determining of the term-category pair includes identifying the term, wherein the identifying of the term includes determining that the term is present in a minimum number of listings within the category of listings, the minimum number of listings being a subset of the category of listings.

7. The method of claim 1 further comprising:
    determining a rank of the term-category pair; and wherein
    the generating of the user-specific query is based on the rank of the term-category pair.

8. The method of claim 7, wherein:
    the rank of the term-category pair is based on a number that represents a quantity of listings within the category of listings, the quantity of listings having titles that include the term from the term-category pair.

9. The method of claim 1, wherein:
    the generating of the user-specific query includes updating a previously generated user-specific query that corresponds to the user; and
    the interaction includes an activity performed by the user since generation of the previously generated user-specific query.

10. The method of claim 1, wherein:
    the term from the term-category pair includes a plurality of words.

11. The method of claim 1, wherein:
    the identifying of the recommended listing includes:
        determining that the set of listings each satisfy a criterion;
        ranking each listing of the set of listings; and
        selecting the recommended listing from the set of ranked listings.

12. The method of claim 11, wherein:
    the determining that the set of listings each satisfy the criterion includes determining that each listing of the set of listings is not designated as for mature audiences.

13. The method of claim 11, wherein:
    the determining that the set of listings each satisfy the criterion includes determining that each listing of the set of listings is not designated as banned by the network-based commerce system.

14. The method of claim 11, wherein:
    the determining that the set of listings each satisfy the criterion includes determining that each listing of the set of listings does not have an expired listing time.

15. The method of claim 11, wherein:
    the determining that the set of listings each satisfy the criterion includes determining that each listing of the set of listings has a remaining time period greater than a minimum time period.

16. The method of claim 11, wherein:
    the network-based commerce system includes a plurality of registration sites;
    the user is registered with the network-based commerce system as corresponding to a registration site among the plurality of registration sites; and
    the determining that the set of listings each satisfy the criterion includes determining that each listing of the set of listings is available to the user based on the registration site that corresponds to the user.

17. A system comprising:
    a database engine implemented using a processor of a machine within a network-based commerce system, the database engine being configured to:
        select a user to receive one or more recommended listings hosted by a network-based commerce system;

determine a term-category pair that pairs a term with a category of listings in which the term matches have used a predetermined number of listings and with which the selected user has interacted; and generate a user-specific query that corresponds to the selected user and that includes the term from the term-category pair; and a search engine configured to:

identify a recommended listing from among a plurality of listings hosted by the network-based commerce system, the identifying of the recommended listing being based on the generated user-specific query and including identifying a set of listings within the plurality of listings, the set of listings being identified between an upper popularity boundary of the term-category pair and a lower popularity boundary of the term-category pair; and provide the recommended listing to a client machine of the selected user.

18. The system of claim 17, wherein:

the database engine is configured to:

determine a rank of the term-category pair; and generate the user-specific query based on the rank of the term from the term-category pair.

19. A non-transitory machine-readable storage medium comprising instructions that, when executed by one or more processors of a machine, cause the machine to perform operations comprising:

selecting a user to receive one or more recommended listings hosted by a network-based commerce system;

determining a term-category pair that pairs a term with a category of listings in which the term matches at least a predetermined number of listings and with which the selected user has interacted;

generating a user-specific query that corresponds to the selected user and that includes the term from the term-category pair;

identifying a recommended listing from among a plurality of listings hosted by the network-based commerce system, the identifying of the recommended listing being based on the generated user-specific query and including identifying a set of listings within the plurality of listings, the set of listings being identified between an upper popularity boundary of the term-category pair and a lower popularity boundary of the term-category pair; and providing the recommended listing to a client machine of the selected user.

\* \* \* \* \*

UNITED STATES PATENT AND TRADEMARK OFFICE
CERTIFICATE OF CORRECTION

PATENT NO. : 8,712,868 B2
APPLICATION NO. : 12/870031
DATED : April 29, 2014
INVENTOR(S) : Foster et al.

Page 1 of 1

It is certified that error appears in the above-identified patent and that said Letters Patent is hereby corrected as shown below:

IN THE CLAIMS:

In column 15, line 37, in Claim 1, delete "including" and insert --including:--, therefor In column 17, line 13, in Claim 17, delete "including" and insert --including:--, therefor In column 18, line 17, in Claim 19, delete "including" and insert --including:--, therefor Signed and Sealed this
Eleventh Day of November, 2014

Michelle K. Lee
*Deputy Director of the United States Patent and Trademark Office*